(12) United States Patent
Cser et al.

(10) Patent No.: US 11,645,139 B2
(45) Date of Patent: May 9, 2023

(54) SOFTWARE TESTING

(71) Applicant: Functionize, Inc., Walnut Creek, CA (US)

(72) Inventors: Tamas Cser, Walnut Creek, CA (US); Jonathon R. Seaton, Walnut Creek, CA (US)

(73) Assignee: Functionize, Inc., Walnut Creek, CA (US)

( * ) Notice: Subject to any disclaimer, the term of this patent is extended or adjusted under 35 U.S.C. 154(b) by 152 days.

(21) Appl. No.: 17/281,566

(22) PCT Filed: Oct. 2, 2019

(86) PCT No.: PCT/US2019/054366
§ 371 (c)(1),
(2) Date: Mar. 30, 2021

(87) PCT Pub. No.: WO2020/072701
PCT Pub. Date: Apr. 9, 2020

(65) Prior Publication Data
US 2021/0390011 A1    Dec. 16, 2021

Related U.S. Application Data

(60) Provisional application No. 62/749,490, filed on Oct. 23, 2018, provisional application No. 62/749,533, (Continued)

(51) Int. Cl.
*G06F 11/00*  (2006.01)
*G06F 11/07*  (2006.01)
*G06F 11/36*  (2006.01)
*G06N 3/08*  (2023.01)
*G06N 3/047*  (2023.01)

(52) U.S. Cl.
CPC ........ *G06F 11/079* (2013.01); *G06F 11/3684* (2013.01); *G06F 11/3688* (2013.01); *G06N 3/047* (2023.01); *G06N 3/08* (2013.01)

(58) Field of Classification Search
CPC . G06F 11/079; G06F 11/3684; G06F 11/3688
See application file for complete search history.

(56) References Cited

U.S. PATENT DOCUMENTS 8,365,147 B2   1/2013   Grechanik et al.
8,782,606 B1   7/2014   Cohen et al.
(Continued)

FOREIGN PATENT DOCUMENTS

WO    WO 2020/072701    4/2020

OTHER PUBLICATIONS

Baek (2019) "Character Region Awareness for Text Detection" arXiv:1904.01941 [cs.CV] 12 pages.
(Continued)

*Primary Examiner* — Joshua P Lottich
(74) *Attorney, Agent, or Firm* — Casimir Jones S.C.; Thomas A. Isenbarger

(57) ABSTRACT

Provided herein is technology relating to testing software and particularly, but not exclusively, to methods for identifying the cause of a failed software test using probabilistic graphical models and/or a rules engine to evaluate and sort test steps by likelihood of failure for dynamic applications.

17 Claims, 9 Drawing Sheets

Related U.S. Application Data filed on Oct. 23, 2018, provisional application No. 62/740,409, filed on Oct. 2, 2018.

(56) References Cited

U.S. PATENT DOCUMENTS

| | | | | |
|---|---|---|---|---|
| 9,507,700 | B1* | 11/2016 | Vignet | G06F 11/3688 |
| 11,599,445 | B2* | 3/2023 | Liu | G06F 9/30098 |
| 2004/0260678 | A1* | 12/2004 | Verbowski | G06F 11/0706 |
| 2011/0016356 | A1 | 1/2011 | Artzi et al. | |
| 2011/0320228 | A1* | 12/2011 | Kowalski | G06Q 10/063 705/7.11 |
| 2012/0191531 | A1 | 7/2012 | You et al. | |
| 2013/0024847 | A1 | 1/2013 | Browne et al. | |
| 2014/0258784 | A1* | 9/2014 | Tepus | G06F 11/3688 714/38.1 |
| 2015/0339213 | A1 | 11/2015 | Lee et al. | |
| 2016/0371173 | A1* | 12/2016 | Ignatyev | G06F 11/3692 |
| 2017/0262360 | A1* | 9/2017 | Kochura | G06F 11/3688 |
| 2017/0344459 | A1* | 11/2017 | Horesh | G06F 11/3644 |
| 2018/0300229 | A1* | 10/2018 | Kornfeld | G06F 11/079 |
| 2019/0121719 | A1* | 4/2019 | Hamon | G06F 11/0769 |
| 2020/0034282 | A1* | 1/2020 | He | G06F 11/3688 |

OTHER PUBLICATIONS

Baum (1966) "Statistical Inference for Probabilistic Functions of Finite State Markov Chains" The Annals of Mathematical Statistics 37: 1554-63.

Baum (1967) "An inequality with applications to statistical estimation for probabilistic functions of Markov processes and to a model for ecology" Bulletin of the American Mathematical Society 73: 360. 4 pages.

Baum (1970) "A Maximization Technique Occurring in the Statistical Analysis of Probabilistic Functions of Markov Chains" The Annals of Mathematical Statistics 41: 164-71.

Baum (1972) "An Inequality and Associated Maximization Technique in Statistical Estimation of Probabilistic Functions of a Markov Process" Inequalities 3: 1-8.

Baum, (1968) "Growth transformations for functions on manifolds" Pacific Journal of Mathematics 27: 211-27.

Bersekas (2011) "Dynamic Programming and Optimal Control" 3rd Edition, vol. II, MIT Press, Cambridge, Mass. 233 pages.

Extended European Search Report for 19869864.9, dated Aug. 29, 2022, 12 pages.

International Search Report and Written Opinion for PCT/US19/54366. dated Feb. 6, 2020. 12 pages.

Kindermann (1980) Markov Random Fields and Their Applications, Contemporary Mathematics, 1. American Mathematical Society, Providence, R.I. TOC only. 11 pages.

Lauritzen (1996) Graphical models, Oxford, Clarendon Press, p. 33 et seq.

Li (2009) Markov Random Field Modeling in Image Analysis. Springer, 3rd ed. (editor Sameer Singh) TOC only. 7 pages.

Redmon (2015) "You Only Look Once: Unified, Real-Time Object Detection" arXiv:1506.02640 [cs.CV] pp. 779-788.

Redmon (2016) "YOLO9000: Better, Faster, Stronger" arXiv:1612.08242 [cs.CV] pp. 7263-7271.

Redmon (2018) "YOLOv3: An Incremental Improvement" arXiv:1804.02767 [cs.CV], pp. 1-6.

Ronneberger (2015) "U-Net: Convolutional Networks for Biomedical Image Segmentation" arXiv:1505.04597 [cs.CV] pp. 234-241.

Simonyan (2015) "Very Deep Convolutional Networks for Large-Scale Image Recognition" arXiv:1409.1556 [cs.CV] pp. 1-14.

\* cited by examiner

SOFTWARE TESTING

This application is a national phase application under 35 U.S.C. § 371 of International Application No. PCT/US2019/054366, filed on Oct. 2, 2019, which claims priority to U.S. provisional patent application Ser. No. 62/740,409, filed Oct. 2, 2018; U.S. provisional patent application Ser. No. 62/749,490, filed Oct. 23, 2018; and U.S. provisional patent application Ser. No. 62/749,533, filed Oct. 23, 2018, each of which of the foregoing is incorporated herein by reference in its entirety.

FIELD

Provided herein is technology relating to testing software and particularly, but not exclusively, to methods for identifying the cause of a failed software test using probabilistic graphical models and a rules engine to evaluate and sort test steps by likelihood of failure for web applications having graphical user interfaces.

BACKGROUND

A major contributor to the cost of software testing and maintenance is that a failed action during a software test is often not the cause of a software test failure. In such cases, identifying the cause of the software test failure and remedying the cause of the failure requires time and resources, increases software downtime, and negatively affects the user experience. For example, user interface (UI) testing is a part of the software delivery process. It is used to verify that software is functioning properly and to check for bugs. Traditionally, UI testing was performed by quality engineers. However, that approach has not scaled with modern applications in which UI plays a more prominent role. Accordingly, new technologies are needed to identify the causes of software test failures.

SUMMARY

Some technologies for automated testing have been developed. While some early solutions were bespoke tests for each particular software project, more recent solutions include open-source frameworks for UI testing (e.g., Selenium). Selenium is a system designed to replicate the actions of a user interacting with a UI. These and related systems comprise several components: engineers construct test scripts using a scripting language and these test scripts are converted into a domain-specific language called Selenese. When a test is run, the Selenese script is passed to a webdriver module that converts the Selenese script into a sequence of actions that is performed in a browser and the results of the actions are evaluated. While this approach is powerful, it suffers from several drawbacks. First, the process of constructing a test script is slow and painstaking. At every test step, the script writer identifies the elements with which the user and test script interacts, determines the action to perform on the element, and verifies that the expected (correct) result occurs. This process is repeated for each step of the script. Further, script construction involves uniquely identifying the correct element on which to perform an action. This is performed using element selectors; selecting an incorrect element selector may produce a false test result. Finally, user interfaces change over time. As a result, elements and element selectors also change and tests thus fail incorrectly. Previous technologies thus required a tester to update each test with new element selectors manually.

Many test failures are easy to identify, e.g., a test fails because the script cannot find the correct element. Other failures are subtle, e.g., the script selects an element, but the selected element is not the correct element. Usually, such a failure is detected many steps later in a test. One exemplary embodiment is a shopping site comprising two buttons to add items to a shopping cart. The first button adds the viewed item and the second button adds a special offer item. If a script to check adding a viewed item to a cart and then to check the cost of items in the cart accidentally selects the second button, the test will produce an error when the script checks the contents of the shopping cart and the cost.

Identifying the root cause of test failures is difficult to do manually. A test engineer must step backward through the test. At each test step, the engineer compares what actually happened with what was expected to happen. Having found a possible cause for an error, the engineer makes a change, reruns the test, and determines if the change corrected the error. Often, this process comprises several iterations to identify the correct change to make. The types of failures include, but are not limited to: incorrect element selection, data changes, and over-precise or unsuitable comparison. Incorrect element selection occurs when a script chooses the incorrect element on a page, e.g., the wrong button, wrong item on a menu, etc. This can happen after a page is restyled or a layout changes. With respect to data changes, most modern UI are dynamically constructed from a database. If the data in a database changes, the UI can change significantly. In some cases, a script will fail unpredictably as a result. Finally, over-precise or unsuitable comparison errors may occur when comparing a value produced by a test to an expected value using an unsuitable precision. These and other issues increase the difficulty of identifying real and false failures and identifying the cause of a false failure.

Accordingly, provided herein is a technology for identifying the causes of a software test failure, e.g., for web applications comprising UI. In some embodiments, the technology further provides for self-healing and fixing failed software tests, e.g., by suggesting and/or providing new test steps to replace test steps comprising a root cause of a failed test and performing the new steps iteratively until the software test is successful. In some embodiments, each step is validated to identify anomalies on a web application UI. In some embodiments, the technology comprises a classifier that detects a change in a UI and alerts a user that the change is a new feature. In some embodiments, the technology described herein identifies the cause of a failed software test through combining a probabilistic graphical model (PGM) and a rules engine. In some embodiments, a software test case (e.g., comprising a test application (e.g., a test web application) and a series of test steps (e.g., a series of interactions with the test web application (e.g., a series of interactions with one or more elements of the test web application)) is built such that all test steps and verifications execute successfully for the test application. In some embodiments, the technology identifies failures of an application that are caused by the dynamic structure of the application (e.g., a change in an attribute and/or function of an element of the application), e.g., that causes changes in the location and/or function of test elements for subsequent execution of the test case. In some embodiments, probabilistic graphical models are constructed from the state of elements on the application and interactions taken during each test step. Upon test failure, the probabilistic graphical model is evaluated to sort test steps by likelihood of failure.

Furthermore, in some embodiments, the technology comprises a rules engine to supplement and/or override identified failures.

Accordingly, in some embodiments the technology provides a method for identifying a root cause of a failed software test of a web application comprising a user interface. For example, in some embodiments, the method comprises providing a web application comprising a user interface; providing a script comprising a series of test steps, wherein each test step comprises an action performed on an element of said user interface; running said script on said web application; identifying an error step of said script at which a failed software test reports a failure; and producing a list of suggested test steps and/or elements ranked by a likelihood that each suggested test step and/or element is the root cause of said failed software test. In some embodiments, the producing step comprises identifying first elements of a first version of said user interface using computer vision and determining element attributes for each element of said first elements; identifying second elements of a second version of said user interface using computer vision and determining element attributes for each element of said second elements; identifying differences between said first version of said user interface and said second version of said user interface by comparing said element attributes for each element of said first elements with said element attributes for each element of said second elements; training a probabilistic model using said differences to produce a trained probabilistic model; and assigning to each test step and/or to each element of said user interface said likelihood that each test step and/or each element is a root cause of said failed software test. In some embodiments, the suggested test steps precede said error step.

In some embodiments, using computer vision comprises detecting a text box, recognizing characters, detecting an element, detecting an object, and/or detecting a layout. In some embodiments, the training step comprises receiving as inputs differences identified by comparing 1, 2, 3, 4, 5, 6, 7, 8, 9, 10, 20, 30, 40, 50, 60, 70, 80, 90, 100, or more versions of said user interface. In some embodiments, identifying differences between said first version of said user interface and said second version of said user interface comprises comparing a first graphical and/or attribute model of said first version of said user interface with a second graphical and/or attribute model of said second version of said user interface to produce a probabilistic graphical and/or attribute model. In some embodiments, training comprises assigning weighted scores to attribute categories, elements, and/or test steps. In some embodiments, the assigning step comprises evaluating said probabilistic model to determine said likelihood that each test step and/or each element is a root cause of said failed software test. In some embodiments, training comprises using machine learning. In some embodiments, training comprises using a neural net. In some embodiments, determining element attributes for each element of said first elements and/or determining element attributes for each element of said second elements comprises analyzing source code associated with each element of said first elements and/or analyzing source code associated with each element of said second elements. In some embodiments, each suggested test step and/or element is evaluated by a rules engine to provide suggested corrections to correct said root cause.

In some embodiments, the technology relates to a method for correcting a failed software test case configuration comprising a failed test step. For example, in some embodiments, the methods comprise receiving a list of candidate failed test steps ranked by a likelihood that each candidate failed test step is the root cause of a failed software test; providing each candidate failed test step of said list of candidate failed test steps to a Markov decision process to produce a plurality of trial test case configurations for each candidate failed test step; executing each trial test case configuration for each candidate failed test step; identifying a successful software test; identifying a trial test case configuration that produced the successful software test; comparing said failed software test case configuration and said trial test case configuration that produced the successful software test to identify differences in the trial test case relative to the failed software test case; correcting said failed software test case configuration by replacing a failed step with a corrected step, wherein said corrected step implements said differences in the trial test case relative to the failed software test case. In some embodiments, the executing step comprises executing in parallel each trial test case configuration for each candidate failed test step. In some embodiments, the list of candidate failed test steps is produced by a method comprising providing a web application comprising a user interface; providing a software test case configuration comprising a script comprising a series of test steps, wherein each test step comprises an action performed on an element of said user interface; running said script on said web application; and producing said list of candidate failed test steps ranked by a likelihood that each candidate failed test step is the root cause of said failed software test. In some embodiments, producing said list of candidate failed test steps comprises identifying first elements of a first version of said user interface using computer vision and determining element attributes for each element of said first elements; identifying second elements of a second version of said user interface using computer vision and determining element attributes for each element of said second elements; identifying differences between said first version of said user interface and said second version of said user interface by comparing said element attributes for each element of said first elements with said element attributes for each element of said second elements; training a probabilistic model using said differences to produce a trained probabilistic model; and assigning to each test step and/or to each element of said user interface said likelihood that each test step and/or each element is a root cause of said failed software test.

In some embodiments, the technology relates to a method for autonomously identifying failures in a web application comprising a user interface. For example, in some embodiments, methods comprise analyzing a web application user interface to identify elements of the user interface; analyzing source code of a web application to identify element functions; associating element functions with elements of the user interface to produce element-function associations; inputting web application user interface geometry, text, and images to train a neural network; inputting said elements, element functions, and element-function associations into said trained neural network to identify anomalies in the web application user interface that produce failures in said web application. In some embodiments, analyzing a web application user interface to identify elements of the user interface comprises use of computer vision. In some embodiments, analyzing source code of a web application to identify element functions comprises use of natural language processing. In some embodiments, methods further comprise providing a parallel web crawler to provide a web application user interface. In some embodiments, methods further comprise providing a parallel web crawler to provide a plurality web application user interfaces of the web application. In some embodiments, the method is performed for each step of a test script to validate a web application user interface.

In some embodiments, the technology provides a method for identifying an element that is a new element of a web application user interface or that a changed attribute of an element is relevant to element function. As used herein, an "attribute relevant to element function" refers to an attribute that, when changed, is likely to produce a software test error. For example, a slight change in element color or font size that is imperceptible to the human eye has a minimal effect on the UI and would not be expected to cause a software test error. However, the change in the location of an element such as a button or text input field has a substantial effect on the UI and would be expected to cause a software test error.

In some embodiments, methods comprise providing a web application comprising a user interface; providing a script comprising a series of test steps, wherein each test step comprises an action performed on an element of said user interface; running said script on said web application; identifying an error step of said script at which a failed software test reports a failure; and producing a list of suggested elements ranked by a likelihood that each suggested element is a new element of said user interface and/or that a changed element attribute is relevant to element function. In some embodiments, the producing step comprises identifying first elements of a first version of said user interface using computer vision and determining element attributes for each element of said first elements; identifying second elements of a second version of said user interface using computer vision and determining element attributes for each element of said second elements; identifying differences between said first version of said user interface and said second version of said user interface by comparing said element attributes for each element of said first elements with said element attributes for each element of said second elements; training a probabilistic model using said differences to produce a trained probabilistic model; and assigning to each element of said user interface said likelihood that each element is a new element of said user interface and/or that a changed element attribute is relevant to element function. In some embodiments, the trained probabilistic model classifies a difference between said first version of said user interface and said second version of said user interface as a root cause of a software test failure; a new user interface element; or a change in an element attribute that is relevant to element function. In some embodiments, methods further comprise correcting the error step of said test script to account for a new web application user interface element or a changed attribute of a web application user interface element. In some embodiments, methods further comprise alerting a user that the web application user interface comprises a new element or that an attribute of a user interface element has changed and/or receiving user confirmation that a web application user interface comprises a new element or that an attribute of a user interface element has changed. Related systems and uses are also provided.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings.

Figure 1:
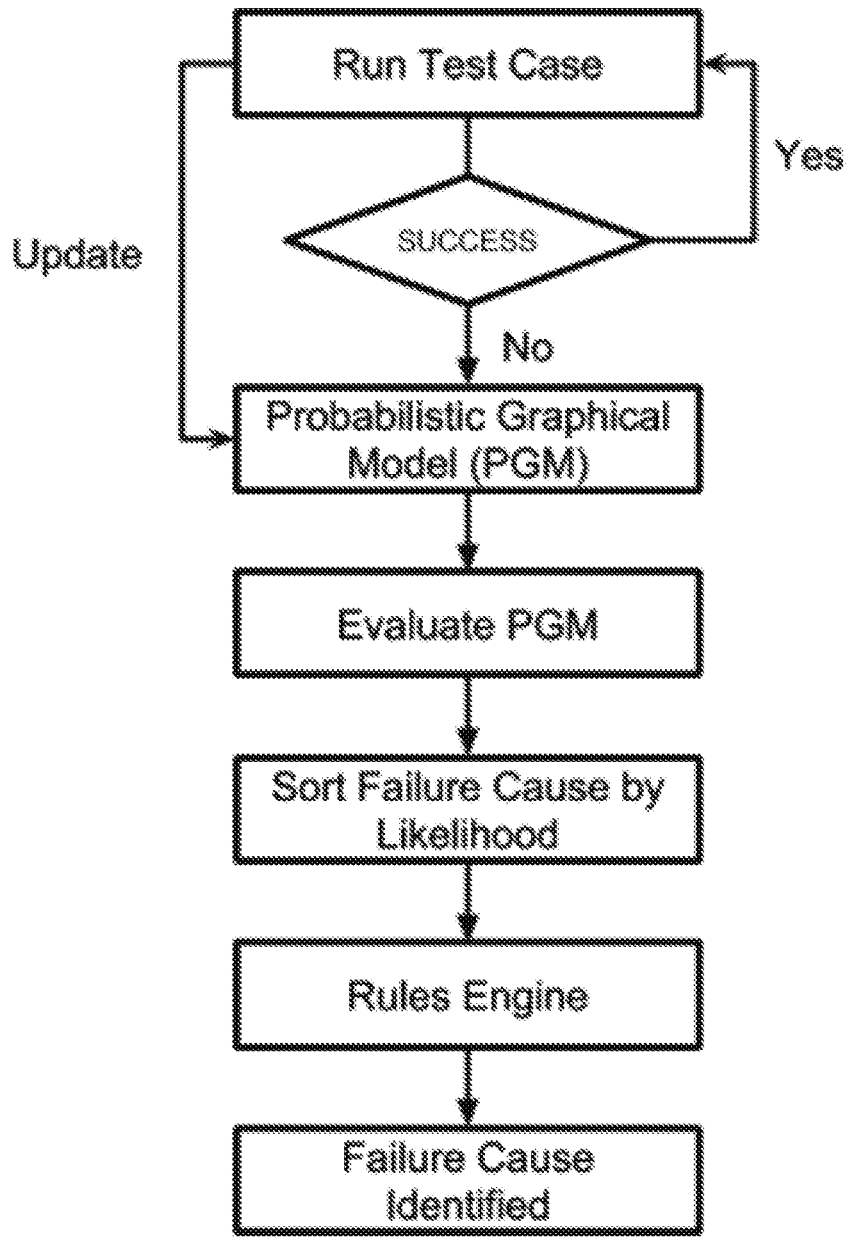
FIG. 1 is a flowchart of an embodiment of the technology provided herein for identifying the cause of a failed software test.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to testing software and particularly, but not exclusively, to methods for identifying the cause of a failed software test using probabilistic graphical models and/or a rules engine to evaluate and sort test steps by likelihood of failure for dynamic applications.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "graphical processing unit-free" system does not comprise a graphical processing unit, a "sorting-free" method does not comprise a sorting step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, an "increase" or a "decrease" refers to a detectable (e.g., measured) positive or negative change, respectively, in the value of a variable relative to a previously measured value of the variable, relative to a pre-established value, and/or relative to a value of a standard control. An increase is a positive change preferably at least 10%, more preferably 50%, still more preferably 2-fold, even more preferably at least 5-fold, and most preferably at least 10-fold relative to the previously measured value of the variable, the pre-established value, and/or the value of a standard control. Similarly, a decrease is a negative change preferably at least 10%, more preferably 50%, still more preferably at least 80%, and most preferably at least 90% of the previously measured value of the variable, the pre-established value, and/or the value of a standard control. Other terms indicating quantitative changes or differences, such as "more" or "less," are used herein in the same fashion as described above.

As used herein, a "system" refers to a plurality of real and/or abstract components operating together for a common purpose. In some embodiments, a "system" is an integrated assemblage of hardware and/or software components. In some embodiments, each component of the system interacts with one or more other components and/or is related to one or more other components. In some embodiments, a system refers to a combination of components and software for controlling and directing methods.

As used herein, the term "web application" refers to a client-server computer program that is executed by the client in a web browser. Common web applications include web-mail, online retail sales, and online auction. In some embodiments, the web application comprises a user interface and/or client-side logic (e.g., code executed on a client computer). In some embodiments, a web application comprises one or more web pages and the user interface refers to the appearance, design, and elements of the one or more web pages.

As used herein, the term "element" refers to a data structure that can be identified by an identifier and/or a relationship with another element. For example, an element may have a unique identifier that is a string, such as a name, number, or symbol. Accordingly, the element may be referenced and/or retrieved using the identifier. Further, if a particular element is the first child element of a parent element, then the particular element may be referenced and/or retrieved using a pointer to the parent element and then retrieving a pointer to the first child element. A browser and/or runtime environment may provide one or more Application Programming Interfaces ("APIs") for referencing and/or retrieving elements. Thus, in some embodiments, the term "element" refers to a component of a web application (e.g., a graphical component of a graphical user interface of an application) with which a user (e.g., a person, another application, an application programming interface, etc.) interacts. In some embodiments, interacting with an element causes the web application to perform a function. In some embodiments, an "element" is a button, hyperlink, text box, text area, check box, slider, radio button, menu, menu item, scroll bar, combo box, toggle button, spin button, tool bar, widget, image, window, calendar, tab strip, list box, thumbnail, etc. In some embodiments, an element is a web page or screen. In some embodiments, an element comprises other elements, e.g., a web page comprising one or more buttons, text fields, etc. In some embodiments, source code corresponding to an element or associated with an element is mappable to a visible element presented on a screen of a client device for viewing by a user.

As used herein, the term "attribute" refers to data that identify and/or describe the appearance, behavior, and/or content of an element. An element may have any number of attributes, e.g., element type; location on a screen, window, or page; color; text; size; border; typeface; and code associated with the element.

As used herein, the term "user" refers to a person (e.g., real or virtual) that interacts with an application (e.g., with an element of an application). In some embodiments, a user is a person (e.g., that interacts with an application through a graphical user interface). In some embodiments, a user is another application (e.g., a script) or software component that interacts with an application.

As used herein, the terms "module" or "component" refer to hardware or software implementations configured to perform the actions of the module or component. In some embodiments, a module or component is a software object or software routine that is stored on and/or executed by general purpose hardware (e.g., computer-readable media, processing devices, etc.). In some embodiments, components and/or modules are implemented as objects or processes that execute on a computing system (e.g., as separate threads). While some of the systems and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modules executing on a computing system.

As used herein, the term "a user sequence" is a series of actions that mimic interaction of a user with one or more elements of a web application UI.

As used herein, the term "browser" refers to a software application for retrieving, presenting, and traversing information resources on the World Wide Web, such as, for example, Mozilla Firefox, Internet Explorer, Microsoft Edge, Google Chrome, Apple Safari, or any other web browser provided for use on a desktop, laptop, and/or mobile device.

As used herein, the term "user interface" (UI) refers to a program interface that utilizes displayed graphical information to allow a user to control and/or operate a web application, for example, by a pointer and/or a pointing device. A pointer may refer to a cursor, arrow, or other symbol appearing on a display and may be moved or controlled with a pointing device to select objects, populate fields, input commands, etc. via the UI. A pointing device may refer to any object and/or device used to control a cursor and/or arrow, to select objects, to populate fields, or to input information such as commands and/or drop-down menu options, for example, via a UI of the web application. Such pointing devices may include, for example, a mouse, a trackball, a track pad, a track stick, a keyboard, a stylus, a digitizing tablet, a digital pen, a fingertip in combination with a touch screen, etc. A cursor may refer to a symbol or pointer where an input selection or actuation may be made with respect to a region in a UI.

As used herein, the terms "click" or "clicking" refer to a selection process made by any pointing device, such as a mouse, for example, but use of such terms is not intended to be so limited. For example, a selection process may be made via a touch screen. In such a case, "clicking" may be replaced by "touching." However, these are merely examples of methods of selecting objects or inputting information, and claimed subject matter is not limited in scope in these respects.

As used herein, the term "interact with an element" refers to performing an action (e.g., clicking) on an element of a web application UI to select it, change its state, select an option from a list, activate a pull-down menu, input a value, select a value, and the like.

As used herein, the term "script" refers to a sequence of user-computer interactions within a user interface that achieves some goal within a computer program or web application. Examples of goals include changing a user password; performing a purchase transaction within a web application; joining a team/group to grant authorizations to read, write, or destroy files controlled by the group; or verifying/changing an email address associated with a user account. Thus, in some embodiments, a script defines a sequence of discrete steps (e.g., interacting with an element) taken by a simulated user, web application, and/or browser to perform a certain task. For example, the script may define a step such as the click of a button in a web application to move to the next screen of the application. In another example, the script may include a step that waits for the web application to validate a first input with a second input before accepting the first input as a password. In some embodiments, a script is routinely executed by a computer to test a web application, e.g., after a change is made to a web application (e.g., after a change is made to the UI of a web application). In some embodiments, a script is run periodically, e.g., hourly, daily, weekly, monthly, and/or yearly. In some embodiments, scripts are executed automatically each time new code is committed to the master branch of a code repository. In some embodiments, scripts simulate user actions using steps that input data at the operating system level. In some embodiments, scripts are written to track output at the operating system level. For example, an operating system level script may include steps that click particular pixels on a screen or that monitor the change in the color of a pixel on a screen. In some embodiments, scripts are provided in a database.

As used herein, the term "root cause" refers to an initiating cause (e.g., element attribute change, action, step) of a software test failure. The term "root cause", in some embodiments, refers to the earliest element attribute change, step, or action in a series of test steps that causes the software test failure.

Description

Web applications often have complex UI for which the permutations and combinations of UI elements give rise to an enormous field of potential commands and command sequences to be tested. Furthermore, web applications change over time, rendering prior test scripts unworkable. Accordingly, in some embodiments, the technology provided herein relates to automated testing of web applications (e.g., UI of web applications) and identifying changes in web applications (e.g., UI of web applications) that is the cause of a software test failure. In some embodiments of the software testing technology provided herein, test automation uses software, usually separate from the software being tested, to control the execution of tests and the comparison of actual outcomes with predicted outcomes. Many software applications today are written as web-based applications to be run in an Internet browser or a browser engine. There are many advantages to automating software tests, e.g., related to the repeatability and execution speed of the tests.

In some embodiments, the technology provides methods and systems for identifying root causes of web application UI test failures, e.g., a web application comprising one or more web pages that comprise web application UI elements. The technology determines the probability of various types of changes (e.g., in element attributes and/or web application code) that are made from one version of a web application to a subsequent version of the web application. The probabilities are used to provide predictions of what elements and types of changes may produce a failure when a web application is tested.

For example, in some embodiments, the technology evaluates a web application UI and identifies the elements present on one or more web pages. In some embodiments, the technology identifies one or more attributes of elements present on a web page. In some embodiments, the technology evaluates code associated with a web page and/or with an element on a web page. In some embodiments, the technology identifies and quantifies relationships (e.g., distance, relative placement) of pairs of elements on a web page. In some embodiments, the technology constructs a graphical model representing the elements on a web page and the relationships among elements on the web page.

In some embodiments, the technology relates to identifying the probability that a web application and/or an element of a web application will change (e.g., as a function of time, version, development, etc.) In some embodiments, the technology identifies a change in an attribute of an element and/or a change in web page code between a first version of the web application UI (e.g., a first version of a web page) and a second version of the web application UI (e.g., a second version of a web page). In some embodiments, the change in an attribute of an element and/or a change in web page code between a first version of the web application UI (e.g., a first version of a web page) and a second version of the web application UI (e.g., a second version of a web page) is represented by a change in the graphical model. In some embodiments, a probabilistic method (e.g., Bayesian analysis, hidden Markov models, etc.) is used to determine a probability that an attribute of an element will change between a first version of the web application UI (e.g., a first version of a web page) and a second version of the web application UI (e.g., a second version of a web page). In some embodiments, a probabilistic method (e.g., Bayesian analysis, hidden Markov models, etc.) is used to determine a probability that a particular region of a web page will comprise a change from a first version of a web application UI (e.g., a first version of a web page) and a second version of a web application UI (e.g., a second version of a web page). In some embodiments, the probability of changes in the graphical model is calculated to provide a probabilistic graphical model of changes in element attributes and/or code for a web application.

In some embodiments, a rules engine comprises rules for checking elements and/or values input and/or calculated during testing. In some embodiments, rules of a rules engine check a value for being greater than a minimum and/or less than a maximum value.

In some embodiments, the probabilistic graphical model and the rules engine are used to produce a ranked list of possible changes in the web application that could produce an error. In some embodiments, the ranked list is sorted by the probability of the change is the web application occurring. In some embodiments, when a test of a web application is performed and an error occurs, the ranked list of possible changes in the web application that could produce the error is queried and the possible changes are checked as possible sources for the error. See, e.g., FIG. 3.

Embodiments of the present technology take the form of an entirely hardware embodiment, an entirely software embodiment, or an embodiment including both hardware and software components. In some embodiments, the technology is implemented in software, which includes but is not limited to firmware, resident software, microcode, etc.

Embodiments can take the form of a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be an electronic, magnetic, optical, electromagnetic, infrared, or semiconductor system (or apparatus or device) or a propagation medium. For example, the medium may include a computer-readable medium such as a semiconductor or solid state memory, magnetic tape, a removable computer diskette, a random access memory (RAM), a read-only memory (ROM), a rigid magnetic disk and an optical disk, etc.

In some embodiments, the technology comprises use of computer vision to evaluate a web application UI, e.g., to identify attributes of elements on a web page. In some embodiments, the technology comprises use of code analysis to characterize code associated with a web application. In some embodiments, the technology comprises use of computer vision to identify changes in the attributes of one or more elements of a web application UI from one version to another version. In some embodiments, the technology comprises use of code analysis to identify changes in code associated with a web application from one version of the web application to another version. In some embodiments, the technology comprises use of both computer vision and code analysis to identify changes in a web application from one version to another version of the web application.

In some embodiments, the technology is implemented in computer software running on a massively parallel computing system associated with a large distributed database. In some embodiments, the technology is implemented using a cloud technology. In some embodiments, models are produced and evaluated on a single local machine or on one or a plurality of virtual machines in a cloud environment.

Web Applications

As described herein, the technology relates to identifying the cause of a test error for a web application comprising a UI. A web application may comprise one or more web pages. A web application may communicate with a database.

In some embodiments, a server computer runs code for the web application on a server side that serves web pages, files, and other content to a web browser executing the web application on the client side. In some embodiments, a client side application executes without the use of a browser. In some embodiments, the web application has elements that are identified, located, and monitored using computer vision and/or by analysis of accessible source code. For example, in some embodiments, a web application that executes on the client side as a series of HTML web pages includes identifiable Document Object Model (DOM) elements. In the HTML DOM, the element object represents an HTML element. HTML element objects can have child nodes (e.g., type element node, text node, or comment node). HTML element objects may also have attributes. Thus, in some embodiments, DOM elements can be located and monitored by embodiments of the technology provided herein that identify, locate, and monitor elements using computer vision and/or analysis of source code (e.g., to reference and/or retrieve an element by a unique identifier and/or by a relative and/or absolute location in a DOM).

In some embodiments, the web application has elements that can be identified, located, and monitored without using standard DOM elements. For example, these elements may be defined using XML files, JSON files, or any other proprietary file type. Accordingly, in some embodiments, the technology relates to an automated testing utility that is configured to identify, locate, and monitor these elements based on computer vision and/or by analysis of computer source code. In embodiments where a web application has multiple screens or pages, each screen or page may be defined as a separate web element with elements contained inside the parent element.

Testing

In some embodiments, the technology provides an automated testing utility that provides tools to create scripts and execute scripts for testing a web application, e.g., for web browser automation. Thus, in some embodiments, each script defines at least one action or event that occurs within a web browser (e.g., an interaction with an element). In some embodiments, the automated testing utility is provided as a plug-in for a web browser. In some embodiments, the automated testing utility does not require a user (e.g., a developer, a software engineer) to write a script comprising a number of steps de novo. In some embodiments, the automated testing utility includes controls to record and edit specific actions or events, controls that facilitate adding test specific commands to the script, and/or a component to perform natural language processing to translate English phrases into script steps.

Monitoring Component

In some embodiments, the technology comprises a component to monitor changes in a web application. In some embodiments, the monitoring component obtains and stores screenshots of the web application while an automated test is running. In some embodiments, the monitoring component captures metadata from one or more scripts, the automated testing utility, and/or the web application while the automated test is executing. In some embodiments, the technology provides a monitoring component that is, e.g., an external program, a plugin for a browser, or an extension of the automated testing utility. In some embodiments, the monitoring component captures screenshots and data produced by the automated testing utility. In some embodiments, the monitoring component directly monitors the application that is being tested or the environment that is executing the application (e.g., a web browser). In some embodiments, the monitoring component stores a picture of a web page as a screenshot and the monitoring component stores source code associated with the picture of the web page that was captured as a screenshot. In some embodiments, style sheets and images are recorded with the source code. In some embodiments, the monitoring component executes with the automated testing utility to capture screenshots during testing of a web application and to capture metadata that describes the context in which the test is being performed. In some embodiments, the metadata is specific for a particular automated test (e.g., the metadata is applicable to every screenshot taken while executing the particular automated test (e.g., name of the test script, name of the web application, etc.) In some embodiments, the metadata is specific for a step or portion of an automated test (e.g., the metadata is applicable to one or more particular screenshots).

Accordingly, embodiments provide a script that provides a series of instructions to an automated testing utility and the automated testing utility interacts with a web application. The monitoring component captures screenshots of the UI of the web application while the script is being executed by the automated testing utility. In some embodiments, screen captures are recorded when defined criteria are satisfied, e.g., when certain types of steps are identified in the script, when certain types of actions or events occur in the web application, or a combination thereof. In some embodiments, screen captures are recorded before they are processed by the automated testing utility or after they are displayed in the UI of the web application. Thus, in some embodiments, the monitoring component tracks an interaction before it occurs by analyzing the script and a screen capture occurs before the UI changes. In some embodiments, the monitoring component records a screen capture after a web application responds to actions taken by a simulated user. Screen captures are recorded relative to the monitoring component identifying an action or event occurring in the script and waiting for the action event to happen in the web application (e.g., as a change in the UI).

In some embodiments, a user (e.g., script) action is a click received as input by a UI and screenshots and associated metadata are recorded during the click. In some embodiments, screenshots and associated metadata are recorded during a web application event, e.g., a validation event, setting flags, variables, or threshold conditions as met, the creation or deletion of a particular element such as a DOM element, communications between the server side web application and the client side web application in either direction or both directions, internal validation functions such as user input being a certain primitive type or a certain length before forwarding the data to a database, successfully executing a sub-routine or function such as scanning for malware, or any combination thereof. In some embodiments, screenshots and associated metadata are recorded during a browser event, e.g., a page loading, loading a previous page in the browser history, loading a next page in the browser history, opening a new page in a new browser, opening a new page in a new tab, saving a page, printing a page, opening a print preview screen, changing the size of text in a web browser, or any combination thereof. In some embodiments, the monitoring component records emails or printed documents as they are sent during an automated test. In some embodiments, the monitoring component records screenshots that are not part of the UI of a web application, e.g., a confirmation message, notification (e.g., an SMS message, a message sent through social media, or other messaging services known in the art) and/or communications that result from interactions with other external web applications, such as a web application that uses an external authentication mechanism or emails sent through third party software as part of the web application. In some embodiments, screenshots are recorded and stored and analysis of the screenshots is used to construct a graphical model. In addition to recording screenshots, the monitoring component records metadata associated with the screenshots captured. In some embodiments, metadata (e.g., the interaction that caused the screenshot to be captured, the location and dimensions of an element that is clicked on a page, the URL of a page that received the click, and the type of user that has accessed the page being clicked) are captured while a screenshot is recorded during an automated test. In some embodiments, metadata include the URL of the webpage that was used to generate the screenshot, the current user, user email, user type (e.g., basic, pro, returning customer, having specific permissions), an account number, user's country, users IP address, number of screenshots recorded during a test, the step within a script corresponding to the screenshot, or any flags applied to the page. In some embodiments, metadata include, e.g., the name of the script or automated test, when the script was last updated, the time of the current test, the scripter of the script or automated test, the actual or simulated GPS location of a device accessing the web application being tested, time of day during the access, or any combination thereof.

Computer Vision

In some embodiments, the technology comprises use of computer vision to analyze a web application (e.g., a web application UI (e.g., a screen shot of a web application UI)). In some embodiments, the technology comprises using computer vision to acquire, process, analyze, and understand digital images. As used herein, the term "understanding" refers to transforming visual images into a description of the image that is stored in a database, data structure (e.g., a graphical model), and/or used by subsequent analysis. In some embodiments, understanding comprises producing information from image data using models based on geometry, physics, statistics, and learning theory. In some embodiments, computer vision is used to determine the presence or absence of an element in a web application UI, determine the size and/or location of an element in a web application UI, and/or determine other attributes of an element in a web application UI. In some embodiments, computer vision recognizes (e.g., identifies) elements and classifies elements, e.g., based on attributes determined by computer vision analysis of the web application UI. In some embodiments, computer vision comprises use of technologies for producing convolutional neural networks. In some embodiments, computer vision comprises identifying changes in the attributes of elements for multiple versions (e.g., 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, or more versions) of a web application UI.

Figure 4:
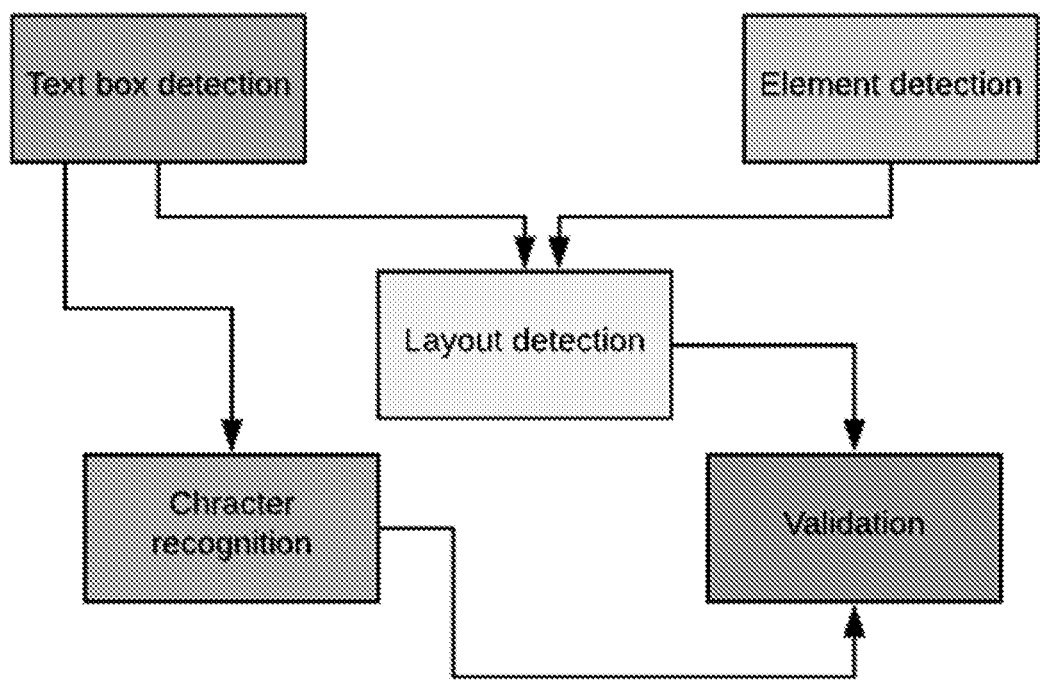
FIG. 4 is a schematic showing the architecture of a computer vision system for analyzing a web application user interface.

In some embodiments, the technology verifies and/or validates web application UI using computer vision. In some embodiments, a document template validation (DTV) technology comprises a text box detection (TBD) component, a character recognition (OCR) component, an element detection (ED) component, a layout detection (LD) component, and/or a template verification (TV) component. In some embodiments, the technology provides a method comprising steps that perform document template validation (DTV), e.g., a method comprising detecting a text box, recognizing characters (e.g., text characters), detecting an element, detecting a layout, and/or a verifying a template. In some embodiments, the technology provides a system comprising modules and/or components configured to perform text box detection, character recognition, element detection, layout detection, and/or template verification. See, e.g., FIG. 4. In some embodiments, components of system embodiments interact (e.g., communicate, transmit data and/or instructions) according to a system architecture, e.g., as shown in FIG. 4. For example, in some embodiments, the TBD component interacts with the LD component and/or the OCR component; the ED component interacts with the LD component; and the OCR component and/or the LD component interact with the TV component. In some embodiments, the communication flow is unidirectional, e.g., as shown in FIG. 4. For example, in some embodiments, data and/or instructions are communicated from the TBD component to the LD component and/or the OCR component; data and/or instructions are communicated from the ED component to the LD component; and data and/or instructions are communicated from the OCR component and/or the LD component to the TV component. In some embodiments, data and/or instructions move bidirectionally among these components according to the system architecture described herein. In some embodiments, each component (e.g., a text box detection (TBD) component, a character recognition (OCR) component, an element detection (ED) component, a layout detection (LD) component, and/or a template verification (TV) component) in configured to provide and/or to receive information and/or data from another component according to the system architecture.

In some embodiments, each module is configured to perform machine learning and/or deep learning to perform its function. For example, in some embodiments, a document template validation (DTV) technology comprises a text box detection (TBD) component configured to perform a method comprising detecting a text box using machine learning and/or deep learning, a character recognition (OCR) component configured to perform a method comprising recognizing characters using machine learning and/or deep learning, an element detection (ED) component configured to perform a method comprising detecting an element using machine learning and/or deep learning, a layout detection (LD) component configured to perform a method comprising detecting a layout using machine learning and/or deep learning, and/or a template verification (TV) component configured to perform a method comprising verifying a template using machine learning and/or deep learning.

In some embodiments, the technology provides systems and methods for detecting a text box on a web application UI. In some embodiments, detecting a text box comprises identifying the location and/or dimensions of a text box on a web application UI. In some embodiments, detecting a text box comprises producing values describing the location (e.g., in x-y screen coordinates and/or in x-y coordinates relative to a window or element comprising the text box) and/or dimensions (e.g., as a height and width) of a text box on a web application UI. In some embodiments, a text box and/or values describing the location and dimensions of a text box on a web application UI is/are passed to a character recognition module.

Figure 2:
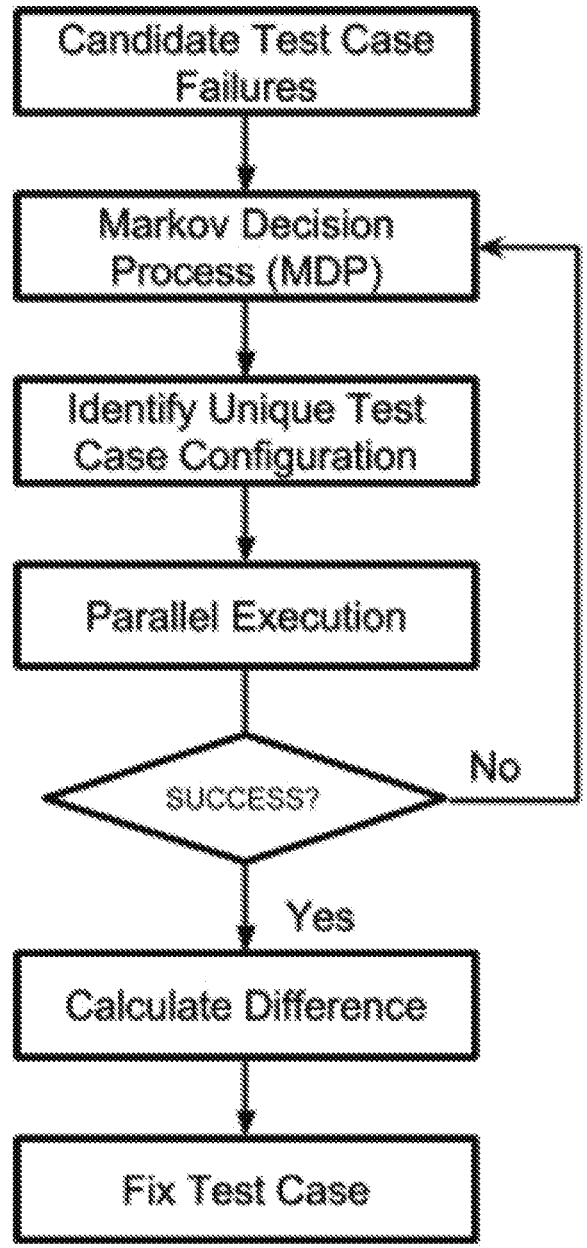
FIG. 2 is a flowchart of an embodiment of the technology provided herein for autonomously finding a solution to a failed software test.

In some embodiments, detecting a text box comprises providing and/or using a neural network to detect text in an image (e.g., a screen image). In some embodiments, a component configured to detect text is configured to use a neural network to detect text in an image (e.g., a screen image). In some embodiments, the technology provided herein comprises a neural network as described in Baek (2019) "Character Region Awareness for Text Detection" arXiv:1904.01941 [cs.CV], incorporated herein by reference. In some embodiments, the neural network comprises an architecture as shown in Baek at FIG. 2 therein, incorporated herein by reference. In some embodiments, the neural network comprises a central convolutional architecture based on VGG-16 with batch normalization (see, e.g., Simonyan (2018) "Very Deep Convolutional Networks for Large-Scale Image Recognition" arXiv:1409.1556 [cs.CV], incorporated herein by reference). In some embodiments, the neural network comprises skip connections (e.g., a decoding component of the neural network comprises skip connections). In some embodiments, the skip connections are similar to U-net (see, e.g., Ronneberger (2015) "U-Net: Convolutional Networks for Biomedical Image Segmentation" arXiv:1505.04597 [cs.CV], incorporated herein by reference). In some embodiments, methods and/or systems for text box detection (e.g., comprising a neural network) produce an output comprising two channels as score maps: 1) a region score used to localize individual characters in the image; and 2) an affinity score used to group each character into a single instance. See Example 1.

In some embodiments, the technology provides methods and systems for detecting an element on a web application UI. In some embodiments, methods for detecting an element on a web application UI comprises grouping text boxes and detecting objects that are not in the text category (e.g., detecting non-text category objects (e.g., buttons, input boxes, icons, etc.)) In some embodiments, systems for detecting an element on a web application comprise a component configured to group text boxes and a component configured to detect objects that are not in the text category (e.g., detect non-text category objects (e.g., buttons, input boxes, icons, etc.)). In some embodiments, methods for element detection comprise detecting text boxes and/or elements comprising grouped text boxes. In some embodiments, methods for element detection comprise detecting objects (e.g., non-text box objects). In some embodiments, systems for element detection comprise a component configured to detect text boxes and/or elements comprising grouped text boxes. In some embodiments, systems for element detection comprise a component configured to detect objects (e.g., non-text box objects).

In some embodiments, detecting an element comprises identifying the location and/or dimensions of an element on a web application UI. In some embodiments, detecting an element comprises producing values describing the location (e.g., in x-y screen coordinates and/or in x-y coordinates relative to a window or element comprising the element) and/or dimensions (e.g., as a height and width) of an element on a web application UI. In some embodiments, an element and/or values describing the location and dimensions of an element on a web application UI is/are passed to a character recognition module.

Figure 6:
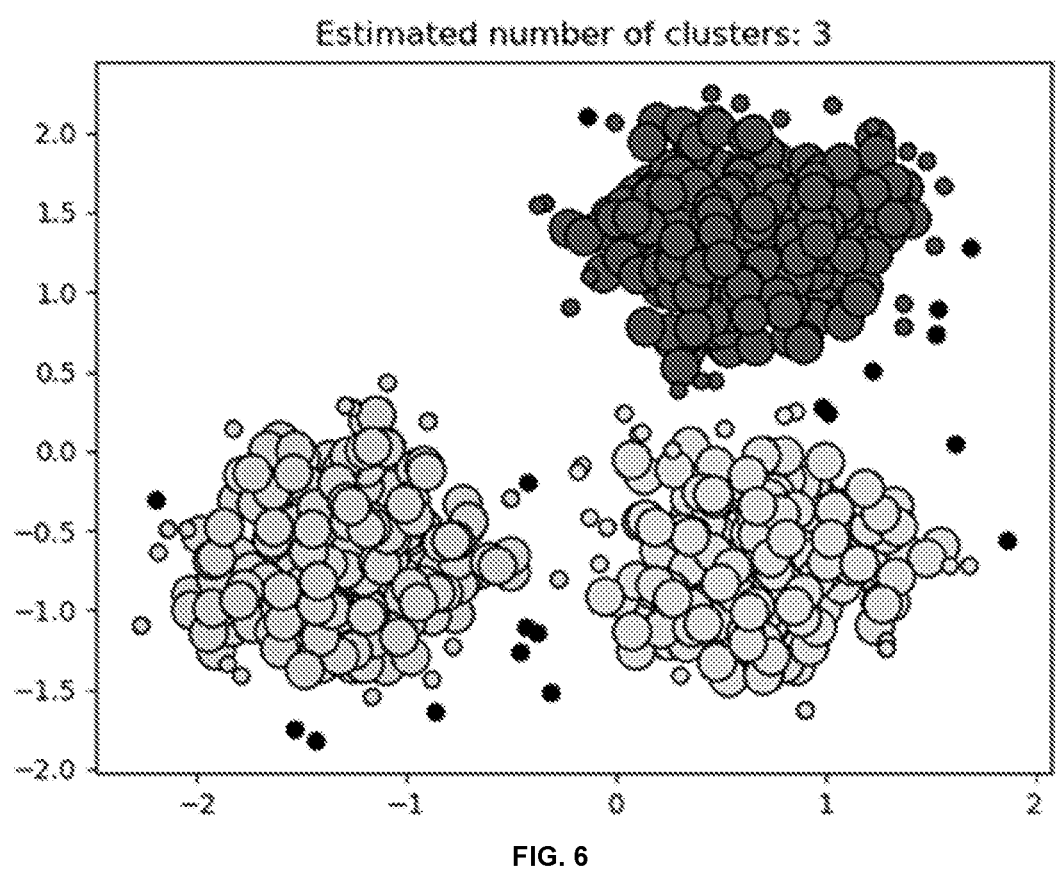
FIG. 6 shows the output of a density based clustering technology as a graphical plot.

In some embodiments, an element of the UI comprises grouped text boxes. In some embodiments, the technology represents a text box by a vector u=(x, y, w, h), where x and y represent the pixel position in the document screenshot or viewport and w and h represent the width and height of the box. In some embodiments, a distance between text boxes is determined. In some embodiments, a distance between text boxes is determined using a method perform by a function encoded in software. In some embodiments, a distance between text boxes is determined using a function encoded as follows:

def block_distance (u, v):
  if u[0]>v[0]:

$dx=u[0]-(v[0]+v[2])$ else:

$dx=v[0]-(u[0]+u[2])$ if u[1]>v[1]:

$dy=u[1]-(v[1]+v[3])$ else:

$dy=v[1]-(u[1]+u[3])$ dx=0 if dx<0 else dx
  dy=0 if dy<0 else dy
  return np.fabs(dx)+np.fabs(dy)

where in this function u and v are two vectors whose elements are defined as u=(x, y, w, h). In some embodiments, the distance between text boxes is provided to a method for density-based clustering that groups text boxes and outputs clusters of text boxes (see, e.g., FIG. 6 and FIG. 7). In some embodiments, the density-based clustering that groups text boxes produces clusters of text boxes, e.g., to identify an element. See, e.g., Example 2.

In some embodiments, the technology provides methods and systems for detecting an object on a web application UI. In some embodiments, a method for element detection comprises a step of object detection. In some embodiments, detecting an object comprises identifying the location and/or dimensions of an object on a web application UI. In some embodiments, detecting an object comprises producing values describing the location (e.g., in x-y screen coordinates and/or in x-y coordinates relative to a window or element comprising the object) and/or dimensions (e.g., as a height and width) of an object on a web application UI. In some embodiments, an object and/or values describing the location and dimensions of an object on a web application UI is/are passed to a character recognition module. In some embodiments, a system comprising a component configured to detect an element comprises a sub-component configured to detect an object. In some embodiments, methods for detecting an object on a web application UI comprises providing and/or using a YOLO neural network. In some embodiments, systems for detecting an object on a web application UI comprises a YOLO neural network (see, e.g., Redmon (2015) "You Only Look Once: Unified, Real-Time Object Detection" arXiv:1506.02640 [cs.CV]; Redmon (2016) "YOLO9000: Better, Faster, Stronger" arXiv: 1612.08242 [cs.CV]; and Redmon (2018) "YOLOv3: An Incremental Improvement" arXiv:1804.02767 [cs.CV], each of which is incorporated herein by reference). In some embodiments, the neural network is trained to identify non-text objects, e.g., icons, buttons, and/or square input boxes. In some embodiments, the neural network comprises an icon classifier trained with a dataset of icons. In some embodiments, the icon classifier identifies and/or classifies an icon as a cart icon, arrow icon, open file icon, save file icon, login icon, checked icon, bullet icon, and/or close icon. In some embodiments, the See Example 3.

Code Analysis

In some embodiments, the technology comprises analyzing computer software (e.g., source code and/or object code associated with a web application). In some embodiments, the technology comprises analyzing source code and/or object code without running the web application. In some embodiments, the technology comprises analyzing source code and/or object code while the web application is running. In some embodiments, natural language processing is used to analyze source and/or object code to identify and associate actions with interface elements (e.g., identified by computer vision and/or by analysis of source code).

Graphical Model, Graphical Model Comparison, and Probabilistic Graphical Models

Embodiments provide technology for producing a graphical model of elements of a web application. In some embodiments, the graphical model comprises relationships between elements of a web application. For example, in some embodiments, the graphical model comprises a map of relative locations of elements of a web application UI. In some embodiments, the graphical model comprises information (e.g., data) describing attributes of elements in the graphical model (e.g., location, type, state, color, size, shape, etc.) In some embodiments, the technology monitors a web application and identifies changes in the graphical model for the web application. For example, a change in the position of a button on the UI of the web application would result in a change in the graphical model describing the UI. Thus, in some embodiments, the technology identifies a change in a first graphical model describing a first version of a web application relative to a second graphical model describing a second version of a web application. In some embodiments, the technology identifies changes in a graphical model that are correlated with other changes. For example, in some embodiments, analysis of the graphical model identifies a first change in the graphical model that occurs (e.g., with a calculated first probability) with a second change in the graphical model more often that the first change in the graphical model occurs (e.g., with a calculated second probability) with a third change in the graphical model. In some embodiments, changes in the graphical model are identified using computer vision. In some embodiments, changes in source code are analyzed. In some embodiments, changes in the graphical model are identified using computer vision and changes in source code are analyzed.

In some embodiments, the monitoring component identifies a step in a script that includes a trigger action or event and the monitoring component identifies the object (e.g., element) in that step that is associated with the trigger action or event. In some embodiments, if analysis of source code indicates that the element has an attribute indicating that it is visible within the web application UI and/or the element is detected as being visible by analysis of a screen shot (e.g., by computer vision), then the location of the element within the web application is recorded. In some embodiments, size data for the element are also be captured. If the object is not visible, data (e.g., attributes) of the element may still be captured. In some embodiments, attributes (e.g., state, location, and size) of elements are recorded by the automated testing utility. In some embodiments, the monitoring component identifies the element that triggers an action or event from a corresponding script and then requests that the automated testing utility produce a location of the identified element based on the name of the identified element or relationship to another element. In some embodiments, the location of an element is the number of pixels (e.g., using a coordinate system describing the screen as x-value, y-value) from the top left corner of a browser display. In some embodiments, the location of an element is mapped to a screenshot taken of the UI. In some embodiments, the data is stored in a graphical model as described herein.

In some embodiments, the monitoring component analyzes a parent element of an identified visible element to determine if the visible element is contained within another visible element. For example, in some embodiments the relevant location of an element is the location within a parent element, e.g., the location of the element relative to the top left corner of the parent element and not the location of the element relative to the web browser display. Thus, in some embodiments, the technology provides methods for determining element locations comprising adjusting locations for the "screen within a screen" effect, e.g., the monitoring component analyzes a script step acting on a visible element for an indication that the visible element is provided within a parent element. Upon identifying an element that is provided within another element, the monitoring component requests the relative location of the parent element in addition to location of the child element from the automated testing utility. In some embodiments, the relative location of the parent element is combined with the relative location of the child element to determine the actual location of the child element. For example, the x-value of a parent element may be added to the x-value of a child element that is located within that parent element. Similarly, the y-value of the parent element may be added to the y-value of the child element. This procedure may be executed recursively for a child element that is multiple parent elements deep (e.g. element within an element within the browser). In some embodiments, location and size data for a visible element are captured after performing edge detection, e.g., using computer vision and image analysis configured to perform edge detection by identifying a group of pixels of similar color and associating those pixels as a single visible element. In some embodiments, the location and size data of the element are then be captured by the monitoring component. Accordingly, embodiments of the technology find use for web applications that are not provided and/or accessed by a browser. In some embodiments, the monitoring component identifies the relative location of an element based on analyzing the source code of a web application. In some embodiments, elements of the web application are identified by analyzing the source code for keywords that identify the names and locations of elements and their attributes that are known to provide a visible element in a UI and the relative location of the elements are mapped to appropriate screenshots that are recorded.

The elements identified by computer vision and/or analysis of source code as described above are recorded in the graphical model. Further, the locations (e.g., relative locations) of the elements, element attribute data, and/or metadata are recorded in the graphical model.

In some embodiments, the technology comprises use of computer vision to analyze recorded screenshots, use of code analysis to identify elements in a UI, and use of the metadata recorded in association with screenshots to create a graphical model of the web application UI.

In some embodiments, the technology produces annotations, e.g., highlighted areas, on a screenshot of the UI for review by a user of the technology provided herein. In some embodiments, the technology comprises use of computer vision to analyze screen shots and/or to produce annotated screen shots. In some embodiments, highlighted areas are provide using a specific shape (e.g., rectangle, oval, square, circle, or cloud) or color (e.g., red, yellow, blue, green, purple, pink, orange, or gray). In some embodiments, a particular shape and/or color provides information to a user of the technology provided herein regarding the type of element and/or type of change in an element identified by the technology as provided herein. For example, in some embodiments, a highlighted color or shape indicating user input is a different highlighted color or shape than the color or shape indicating the occurrence of a web application event. In some embodiments, annotations are provided in the same color for user actions and web application events (e.g., for data presented in grayscale) and changes in an element are indicated by a shape, texture, or icon that differs for an annotation indicating a user input action and for a web application event. In some embodiments, differentiations are provided using text, symbols, sounds, animations, vibrations, or other forms of output known the art.

Comparison Component

In some embodiments, the technology comprises a comparison component. In some embodiments, the comparison component accepts as input a first graphical model and a second graphical model and generates as output a graphical model difference model. The graphical model difference model comprises element difference entries that identify elements having attributes that have changed from the first graphical model and the second graphical model. In some embodiments, the graphical model difference model comprises element sameness entries that identify elements having attributes that have not changed from the first graphical model and the second graphical model. Accordingly, in some embodiments, the graphical model difference model comprises entries that identify elements having some attributes that have changed from the first graphical model and the second graphical model and having some attributes that have not changed from the first graphical model and the second graphical model. In some embodiments, a plurality of graphical models describing a plurality of versions of a web application UI are compared and differences are identified. In some embodiments, probabilistic models (e.g., hidden Markov models) are used to assign probabilities of changes for elements and/or regions of a screen based on the comparisons of the plurality of graphical models.

Accordingly, in some embodiments, the technology comprises a graphical modeling component configured to produce a graphical model; and a graphical model comparison component. In some embodiments, the graphical modeling component accepts a web application (e.g., comprising a UI) having a version N (e.g., "application vN") and creates a vN graphical model. In some embodiments, the graphical modeling component accepts a web application (e.g., comprising a UI) having a version N+1 (e.g., "application vN+1") and creates a vN+1 graphical model. In some embodiments, the graphical model comparison component accepts the vN graphical model and the vN+1 graphical model to produce a graphical model difference model. In some embodiments, The vN graphical model is a model of a first version of a web application and the vN+1 graphical model is a model of a subsequent version of the web application.

In some embodiments, the graphical modeling component accepts a plurality of versions of a web application (e.g., comprising a UI) having version numbers N, N+1, . . . , N+X (e.g., "application vN", "application vN+1", . . . , "application vN+X") and creates a vN graphical model, a vN+1 graphical model, . . . , and a vN+X graphical model. In some embodiments, the graphical model comparison component accepts the vN graphical model, the vN+1 graphical model, . . . , and the vN+X graphical model to produce a graphical model difference model.

In some embodiments, a probabilistic model is used to analyze the graphical model difference model to identify elements that have a high probability of changing between versions of the web application. In some embodiments, a probabilistic model is used to analyze the graphical model difference model to identify regions of a screen, page, window, and/or parent element that have a high probability of changing between versions of the web application. In some embodiments, a probabilistic model is used to analyze the graphical model difference model to rank elements according to their probability of changing between versions of the web application. In some embodiments, a probabilistic model is used to analyze the graphical model difference model to rank regions of a screen, page, window, and/or parent element that have a high probability of changing between versions of the web application. In some embodiments, the ranked list of elements is used to provide output to a user of likely causes of a failed software test. In some embodiments, the ranked list of elements is used to identify problems to correct by autonomous identification of software failures. In some embodiments, the ranked list of elements is used to identify problems to correct by autonomous repair of software failures.

In some embodiments, the technology comprises producing an attribute model that describes the attributes of elements on a web application UI. In some embodiments, the technology comprises producing a plurality of attribute models (e.g., a first attribute model, a second attribute model, . . . ) for a plurality of versions of a web application UI (e.g., a first version, a second version, . . . ). In some embodiments, the comparison component accepts as input a first attribute model and a second attribute model and generates as output an attribute model difference model. The attribute model difference model comprises element difference entries that identify elements having attributes that have changed from the first attribute model and the second attribute model. In some embodiments, the attribute model difference model comprises element sameness entries that identify elements having attributes that have not changed from the first attribute model and the second attribute model. Accordingly, in some embodiments, the attribute model difference model comprises entries that identify elements having some attributes that have changed from the first attribute model and the second attribute model and having some attributes that have not changed from the first attribute model and the second attribute model. In some embodiments, a plurality of attribute models describing a plurality of versions of a web application UI are compared and differences are identified. In some embodiments, probabilistic models (e.g., hidden Markov models) are used to assign probabilities of changes for elements and/or regions of a screen based on the comparisons of the plurality of attribute models.

Accordingly, in some embodiments, the technology comprises an attribute modeling component configured to produce an attribute model; and an attribute model comparison component. In some embodiments, the attribute modeling component accepts a web application (e.g., comprising a UI) having a version N (e.g., "application vN") and creates a vN attribute model. In some embodiments, the attribute modeling component accepts a web application (e.g., comprising a UI) having a version N+1 (e.g., "application vN+1") and creates a vN+1 attribute model. In some embodiments, the attribute model comparison component accepts the vN attribute model and the vN+1 attribute model to produce an attribute model difference model. In some embodiments, The vN attribute model is a model of a first version of a web application and the vN+1 attribute model is a model of a subsequent version of the web application.

In some embodiments, the attribute modeling component accepts a plurality of versions of a web application (e.g., comprising a UI) having version numbers N, N+1, . . . , N+X (e.g., "application vN", "application vN+1", . . . , "application vN+X") and creates a vN attribute model, a vN+1 attribute model, . . . , and a vN+X attribute model. In some embodiments, the attribute model comparison component accepts the vN attribute model, the vN+1 attribute model, . . . , and the vN+X attribute model to produce an attribute model difference model.

In some embodiments, a probabilistic model is used to analyze the attribute model difference model to identify elements that have a high probability of changing between versions of the web application. In some embodiments, a probabilistic model is used to analyze the attribute model difference model to identify regions of a screen, page, window, and/or parent element that have a high probability of changing between versions of the web application. In some embodiments, a probabilistic model is used to analyze the attribute model difference model to rank elements according to their probability of changing between versions of the web application. In some embodiments, a probabilistic model is used to analyze the attribute model difference model to rank regions of a screen, page, window, and/or parent element that have a high probability of changing between versions of the web application. In some embodiments, the ranked list of elements is used to provide output to a user of likely causes of a failed software test. In some embodiments, the ranked list of elements is used to identify problems to correct by autonomous identification of software failures. In some embodiments, the ranked list of elements is used to identify problems to correct by autonomous repair of software failures.

In some embodiments, comparison is performed using a probabilistic model to identify differences between versions of a web application UI (e.g., by identifying differences between models (e.g., graphical and/or attribute models describing versions of a UI)). In some embodiments, the comparison component is configured to provide and/or evaluate a probabilistic model, accept inputs for the probabilistic model, and/or produce outputs from the probabilistic model. In some embodiments, the probabilistic model is a statistical model comprising statistical assumptions, mathematical relationships between pairs of variables, rules, and/or weights associated with data and/or mathematical relationships and/or assumptions. In some embodiments, the probabilistic model is a statistical model that receives as inputs statistical assumptions, mathematical relationships between pairs of variables, rules, and/or weights associated with data and/or mathematical relationships and/or assumptions. In some embodiments, the probabilistic model is a statistical model that identifies and/or produces statistical assumptions, mathematical relationships between pairs of variables, rules, and/or weights associated with data and/or mathematical relationships and/or assumptions by receiving training set data, producing models characterizing the training set data, and evaluating the models characterizing the training set data. In some embodiments, the probabilistic model outputs a probability that a test step is the root cause of a failed software test, a test element acted upon by an action is a root cause of a failed software test, etc. In some embodiments, the probabilistic model is a hidden Markov model (e.g., the model assumes the model describes a Markov system). See, e.g., Baum (1966) "Statistical Inference for Probabilistic Functions of Finite State Markov Chains" The Annals of Mathematical Statistics 37: 1554-63; Baum (1967) "An inequality with applications to statistical estimation for probabilistic functions of Markov processes and to a model for ecology" Bulletin of the American Mathematical Society 73: 360; Baum, (1968) "Growth transformations for functions on manifolds" Pacific Journal of Mathematics 27: 211-27; Baum (1970) "A Maximization Technique Occurring in the Statistical Analysis of Probabilistic Functions of Markov Chains" The Annals of Mathematical Statistics 41: 164-71; and Baum (1972) "An Inequality and Associated Maximization Technique in Statistical Estimation of Probabilistic Functions of a Markov Process" Inequalities 3: 1-8, each of which is incorporated herein by reference. In some embodiments, the probabilistic model comprises use of conditional random fields. In some embodiments, the probabilistic model comprises use of Markov random fields. See, e.g., Kindermann (1980) *Markov Random Fields and Their Applications*, Contemporary Mathematics, 1. American Mathematical Society, Providence, R.I.; Li (2009) *Markov Random Field Modeling in Image Analysis*. Springer, 3rd ed. (editor Sameer Singh); and Lauritzen (1996) *Graphical models*, Oxford, Clarendon Press, page 33 et seq., each of which is incorporated herein by reference.

Identification of Root Causes

In some embodiments, a failed software test triggers a script to run that provides suggested actions (e.g., test steps) that are associated with a likelihood of being a root cause of the failed test. In some embodiments, assigning probabilities of a test failure to individual actions comprises quantifying changes of element attribute values for each action between versions of a web application. In some embodiments, an equal weight is assigned for all attributes. In some embodiments, attributes are assigned weights, e.g., attributes that cause software test failures more often when changed from version to version (e.g., based on knowledge (e.g., data, statistics, rules)) are assigned more weight than attributes that cause software test failures less often when changed from version to version (e.g., based on knowledge (e.g., data, statistics, rules)). In some embodiments, the technology comprises a neural net and/or decision tree model that learns weights to assign to attributes and/or attribute groups depending on likelihood of the attribute being a cause of a failed software test (e.g., as determined by evaluating training sets and/or using machine learning). In addition, in some embodiments, the neural net and/or decision tree model uses data such as, e.g., closeness of a test step action to the failed action in space or in time, the type of action, the type of element, the failure type, etc. to assign weights to attributes and/or attribute groups.

In some embodiments, actions are performed on elements having one or more attributes. Accordingly, embodiments of the technology provided herein group attributes into attribute categories (e.g., to maintain a constant number of input features for the model). In some embodiments, the categories are text, value, type, element, position (e.g., x, y coordinates of the selected element, as well as parent, child, and sibling elements), CSS (e.g., all the CSS attributes prefixed with a 'c_'), selector (e.g., Xpath and Selector attributes), parent (e.g., all the parent element attributes other than the x,y coordinates), child (e.g., all the child element attributes other than the x,y coordinates), sibling (e.g., all the sibling element attributes other than the x,y coordinates), miscellaneous attribute (e.g., HTML attributes such as class, id, href, etc.), and other (anything not in the preceding list).

In some embodiments, scores are assigned to each attribute category based on stability. For example, if an attribute is very stable (e.g., low probability of changing between web application versions and causing a software test error) and the failed test has a low probability value, then the attribute will receive a high score. In some embodiments, the neural net and/or decision tree model uses a "a degree of change score" for an attribute. For example, a numeric attribute is assigned a mean and standard deviation calculated from multiple (e.g., a plurality and/or all) values of the numeric attribute obtained from performing a software test on a plurality of versions of the web application and values from failed tests are compared to determine the number of standard deviations the values are from the mean value. In some embodiments, the Levenshtein distance is used for text values. Accordingly, a text attribute is assigned a mean Levenshtein distance and standard deviation calculated from multiple (e.g., a plurality and/or all) Levenshtein distances of the text attribute obtained from a performing a software test on a plurality of versions of the web application and Levenshtein distances from failed tests are compared to determine the number of standard deviations the Levenshtein distances are from the mean Levenshtein distances.

In some embodiments, each category is assigned an overall score that is the average of all values of elements of a web application that are in the category. In some embodiments, the average is provided into the neural network and/or decision tree model. In some embodiments, the standard deviation is provided into the neural network and/or decision tree model, e.g., to provide information about the structure of scores within each category.

In some embodiments, the neural network and/or decision tree model receives as inputs one or more additional inputs that are used to assign to each step (e.g., action) of a software test the likelihood that each step is a cause of test failure. In some embodiments, the neural network and/or decision tree model receives as input a value describing the number of steps between each test step and the step that caused the failure (e.g., a step closer to the step that caused the failure is considered to be a more likely cause of the failure than a step farther away from the step that caused the failure). In some embodiments, the neural network and/or decision tree model receives as input a Boolean value indicating that an action occurred or did not occur in the same pageinit segment where a software test failed (e.g., actions being in the same pageinit segment have a higher likelihood of being a root cause). In some embodiments, the action type (e.g., click, verify, pageinit, etc.), element type, and/or failure type is/are provided to the neural net and/or decision tree model, e.g., because different actions, elements, and/or failure types may have different probabilities as well as fix suggestions. In some embodiments, the browser type is provided to the neural net and/or decision tree model because different browsers may be associated with different fix suggestions.

In some embodiments, a software test has been performed a plurality of times. In some embodiments, a software test has been performed a plurality of times without software test errors. In some embodiments, a web application that has been tested multiple times without a software test error is a candidate for identifying a cause of a software test error according to the technology provided herein upon a failed software test. In some embodiments, a software test error triggers a script to run that collects one or more items of data discussed herein and/or above, e.g., text, value, type, element, position, CSS, selector, parent, child, sibling, miscellaneous attribute, and other values for element attributes; stability values, degree of change (mean and/or standard deviation), Levenshtein distance (mean and/or standard deviation), overall score, and/or the additional inputs described above regarding test step distance, same pageinit Boolean, action type, element type, failure type, and/or browser type. In some embodiments, a test is corrected (fixed). In some embodiments, after correcting a test, a script runs that outputs the data points and labels indicating which step was fixed and the reason it needed fixed. In some embodiments, changesets are produced by software testers. In some embodiments, a test is fixed by a customer data points are produced that show which step was fixed.

In some embodiments, each action leading up to and including the failed step is a data point. In some embodiments, data points collected for each action comprise a label indicating if the step was identified as a root cause (e.g., Y or N). In some embodiments, a data point for a step comprises a label indicating the reason for fixing, which would be "N/A" for steps that were not identified as being a root cause. In some embodiments, data are used to train a model to predict the likelihood of each action being a root cause and the most likely reason needed to fix. In some embodiments, a function provides probabilities for each action within the test being a root cause, e.g., to provide meaningful estimates for likelihoods.

In some embodiments, a step is identified as a root cause, the step is fixed, and a subsequent step causes a test failure. Accordingly, in some embodiments, the technology indicates the fix as a success and creates data points as usual. In some embodiments, software comprises logic to control creation of data points in such cases. In some embodiments, the process is repeated (e.g., iteratively) until a test passes. In some embodiments, creation of data points and/or label is automated. For example, in some embodiments, a data point is created every time a step is successfully fixed. In some embodiments, a change set and edit history are stored in an API, e.g., upon the completion of a successful test. In some embodiments, data are stored in a database, text file, CSV file, etc. In some embodiments, data are stored in a scalable columnar format (e.g., cloud datastore). In some embodiments, data are obtained using computer vision and/or natural language processing of source code (e.g., HTML).

In some embodiments, training data for a model (e.g., a model used to assign a probabilities to candidate test steps and/or elements that the candidate test steps and/or element are root causes) are produced through a crowd sourced process. Accordingly, the crowd consensus, in some embodiments, rather than a single opinion, is used to determined probabilities. In some embodiments, user feedback is used to identify a fix for a suggested failure and the failure type and cause and the failure fix (and its success or failure) are input into the model for further training.

Attribute Distribution

In some embodiments, the technology evaluates a change of element attributes as a function of position on a page (e.g., position in a UI). In some embodiments, the technology evaluates a change of element attributes as a function of time (e.g., as a function of UI version).

In some embodiments, the technology determines and/or evaluates a probability of an attribute change as a function of position on a page (e.g., position in a UI) and/or as a function of time (e.g., as a function of UI version). See, e.g., Example 4.

In some embodiments, the technology evaluates individual elements (e.g., individual attributes of an individual element, a plurality of attributes of an individual element). In some embodiments, the technology evaluates elements and/or element attributes across a UI (e.g., as a function of location on a page) and/or as a function of time (e.g., as a function of UI version). In some embodiments, frequencies of element attributes for one or more pages and/or versions of a UI are produced and evaluated. In some embodiments, probabilistic associations are calculated and/or produced between an element in one page and/or version of a UI and a second page and/or version of a UI, e.g., to identify an element for which an attribute changed from the first to the second page and/or UI.

In some embodiments, the technology determines a statistical distribution of elements and/or element attributes for a plurality of elements and/or element attributes (e.g., on a page (e.g., on a UI)). In some embodiments, the technology determines a statistical distribution of elements and/or element attributes for a plurality of elements and/or element attributes as a function of location on a page (e.g., as a function of location on a UI) and/or as a function of time (e.g., as a function of UI version). In some embodiments, the technology determines a probability of a particular distribution of elements and/or element attributes on a page (e.g., as a function of location on a UI) and/or through time (e.g., as a function of UI version).

Automated Visual Testing

In some embodiments, visual testing is automated. In some embodiments, testing comprises use of a neural net and/or decision tree model (e.g., a convolutional neural net). In some embodiments, the technology comprises determining if web pages have been correctly rendered. Accordingly, embodiments of the technology provided herein evaluate a web page render by evaluating its visual semantics, e.g., discriminating static versus dynamic elements; identifying page elements (e.g., links, buttons, popdowns, etc.); detecting images nestled in markup; etc. In some embodiments, the technology provides a testing technology for a range of designs, design components (e.g., fonts), low-level browser and/or version rendering variations, dynamic layout changes driven by responsive design, and arbitrary page complexity. The technology provides automated testing that tests frequent releases (e.g., providing a new version of a web site and/or web application) comprising dozens, hundreds, or thousands or more pages, optionally, in multiple languages.

In some embodiments, the technology finds use in helping developers and QA/test engineers avoid coding in preparing test cases, e.g., the technology provides an automated test. Accordingly, in some embodiments, the technology records a test case provided by a user and the technology captures a reviewable 'filmstrip' of page rendering (e.g, no manual or automated acquisition of screen captures is required). The render is analyzed through a decision tree that segments the page into regions, then invokes a range of visual processing tools to discover, interrogate, and classify page elements (e.g., discriminating text from controls and graphics; identifying static vs. dynamic objects; automatically determining what parts of a page are most important to test; etc.) As described herein, embodiments of the technology comprise use of convolutional neural networks trained on sample libraries of fonts, buttons and controls, and other visual elements, and robust standardized solutions for source image processing, optical character recognition, and other basic functions. Once a test case is recorded and validated, it is executed across a plurality of browsers and emulated devices supported. In some embodiments, the technology combines artificial intelligence visual element classification, web code, and realtime DOM analytics. Accordingly, the technology provides in some embodiments a robust technology to provide, e.g., reliable visual testing of very large websites across responsive designs running on multiple devices through a range of viewport configurations all from a small number of recorded test cases. In some embodiments, when changes are made, the tests are self-updating, e.g., by combining deep DOM analytics with sophisticated visual processing, the technology determines what has changed and any changes in functionality caused by the change or other changes relevant to users. In some embodiments, the technology uses recordings of actual user site interactions to refine and focus its visual analysis, constraining this resource-intensive process in response to what users are actually doing on a site.

In some embodiments, the technology comprises databases, e.g., training sets. In some embodiments, the technology comprises a neural network and training sets for the neural network.

Rules Engine

In some embodiments, the technology comprises use of a rules engine. In some embodiments, the rules engine accepts input criteria, determines if the input criteria match a rule of the rules engine, and performs an action of a rule that matches the input criteria. Accordingly, in some embodiments, the rules engine provides a structured way to analyze and evaluate data from a failed test and provide a suggestion for how to fix the test. In some embodiments, the rules of the rules engine are encoded in a rules syntax language (e.g., as an "if-then" or "if-then-else" logic). Thus, in some embodiments, the rules engine comprises rules and suggestions.

In some embodiments, the rules engine comprises rules that are evaluated (e.g., as a decision tree) and suggestions (e.g., that are referenced by name by the rules). In some embodiments, individual rules can also comprise suggestions, vars, or other rules. As used herein, a "var" refers to a list of key/value pairs that define new identifiers that correspond to language expressions. In some embodiments, rules themselves comprise a vars section. In some embodiments, a rule is triggered when its "when" condition is satisfied (Boolean true). If a rule is triggered, then its suggestion is evaluated and returned or its children are evaluated. If a rule is not triggered (e.g., because its "when" condition is not satisfied), then its children are evaluated. Rules may be nested as deeply as is necessary. See Table 1.

TABLE 1

| | Rules | |
|---|---|---|
| | Field | Description |
| 1 | when | Condition that must be satisfied for this rule to be fired. |
| 2 | rules | Child rules that are evaluated only if when is true. |
| 3 | suggestion | A suggestion to provide as a language result. |

In some embodiments, the rules engine comprises one or more suggestions. In some embodiments, a suggestion comprises metadata describing itself (e.g., name and description) and a changes field comprising an arbitrary map of key/value pairs indicating which fields on the test input should be updated to fix the test. See, e.g., Table 2.

TABLE 2

| | Suggestions | | |
|---|---|---|---|
| | Field | Description | Value |
| 1 | name | The name of the suggestion. When used in the root suggestions list, this is the name used to reference it from the individual rules that return it. This field is optional for inline suggestions. | A unique string. |
| 2 | description | An optional plain English description of what the suggestion means or does. | Plain English. |
| 3 | changes | This should contain a map of the JSON attributes that could be changed on the test in order to fix it. Values in this map are evaluated as expressions in the rule language. | Map of arbitrary key/value pairs. |

Autonomous Identification of Software Failures

In some embodiments, the technology provided herein relates to identifying failures in a software application (e.g., a web application), e.g., using artificial intelligence. For example, some web-based technologies comprise use of a link crawler that typically begins its crawl by loading the web page at the base URL of a web application environment. After collecting information about that base page (e.g., comprising a screen shot, load time, error information, etc.), the crawler will take further actions by interacting with one or more elements on the page, e.g., clicking the first hyperlink on that page and checking the result. If the hyperlink is within the domain of the provided base URL, the crawler will visit the page and collect information about the linked page in the same way it collected information about the base page (e.g., comprising a screen shot, load time, error information, etc.) Further links identified on the base page and subsequently visited pages are visited in the same manner. The technology does not limit the information collected for each page and includes, e.g., any of the web application, screen shot, metadata, element, element attribute, and/or graphical model data described herein.

In some embodiments, the technology relates to a crawler that combines computer vision analysis of web application UI (e.g., screen shots of web application UI) with natural language processing to find failures, e.g., incorrect icons, broken application programming interfaces, visual anomalies, spelling errors, broken links, and other web application errors known in the art. In some embodiments, the technology is implemented in computer software running on a massively parallel computing system associated with a large distributed database. In some embodiments, the technology is implemented using a cloud technology. In some embodiments, the crawler is produced and executed on a single local machine or on one or a plurality of virtual machines in a cloud environment.

In some embodiments, the technology relates to autonomous identification and/or detection of failures in a software application. In some embodiments, the technology comprises using a combination of computer vision, natural language processing, and a parallel web crawler. In particular, some embodiments provide use of computer vision analysis to identify interface elements in a UI, e.g., as described herein, and use of text and language processing to identify and associate actions (e.g., encoded in software code) with interface elements. In some embodiments, the technology comprises detecting elements, optionally localizing elements, and classifying elements using a combination of data describing the element (e.g., element attributes (e.g., location, size, state)) and the function of an element (e.g., as provided by software code associated with the element) in the web application. In some embodiments, classifying an element assigns an action and/or function to the detected elements. In some embodiments, natural language processing determines a meaning of the action and/or function according to the association with the element. In some embodiments, the text content of a web application is obtained through a document object model (DOM) and the analysis of the web application is provided by use of artificial neural networks. In some embodiments, associations of actions and/or functions with elements detected by computer vision are determined by the geometrical attributes of an element, e.g., position in the rendering, relative position with respect to other elements (e.g., parent elements and/or sibling elements and/or elements at the same level). In some embodiments, the technology comprises use of a neural network using the element geometrical attributes, text, and images to identify software errors and/or other anomalies.

Autonomous Repair of Software Failures

In some embodiments, the technology relates to autonomous repair (e.g., correction, fixing, etc.) of software failures and/or software test cases, e.g., using artificial intelligence. For example, as described herein, root causes of software failures (e.g., identified by a software test) may be resolved with multiple solutions in some cases. For example, in cases where a correct solution is not immediately apparent, the technology provides a self-heal feature that automatically re-runs a software test with each of the available suggested solutions. However, debugging test failures in automated tests often requires scripting or recording the test, running it until it fails, trying to identify the failure, updating the test script and running it again. Often this process is repeated repeatedly before the test works. A subsequent change in the application might cause the test to break and the whole process requires repeating.

Thus, embodiments of the technology provide autonomous repair of software failures, e.g., as a technology implemented as a set of computer programs running on a massively parallel computing system that use a large distributed database. In some embodiments, the technology finds use in the presence or in the absence of detecting a failure in the web application being tested. First, embodiments comprise identifying, providing, and/or retrieving a list of candidate failure steps in a failed software test case, e.g., as provided in a list of suggested test steps, test actions, and/or elements ranked by likelihood of being a root cause of a software test failure of a web application UI as described herein. Next, each of the candidate failure steps is used as an input to train a Markov decision process (MDP) model (see, e.g., Bersekas (2011) "Dynamic Programming and Optimal Control" 3rd Edition, Volume II, MIT Press, Cambridge, Mass., incorporated herein by reference) to identify possible changes for each candidate failure step that might produce a successful software test. The MDP produces a plurality of trial steps for each candidate failure step by reconfiguring each candidate failure step using a plurality of different configurations as determined from the MDP. Each of the different configurations provides a trial step that is a possible replacement of the candidate failure step that may result in a successful test when the trial step replaces the candidate failure step. Next, all trial steps (e.g., proposed fixes of a candidate failure step) or test scripts replacing a candidate failure step with a trial step are executed in parallel to test the web application UI. In some embodiments, the process is iterative and is complete once the software test case successfully passes. Finally, the technology identifies a difference from the failed and successful software test cases (e.g., between the failed and successfully reconfigured test steps) to provide an acceptable solution of the failed test detected for the software test case. See, e.g., FIG. 2.

Hardware

In some embodiments, the technology provided herein is implemented by one or more special-purpose computing devices. In some embodiments, the special-purpose computing devices are hard-wired to perform embodiments of the technology and, in some embodiments, hardware comprises digital electronic devices such as one or more application-specific integrated circuits (ASICs) or field programmable gate arrays (FPGAs) that are persistently programmed to perform embodiments of the technology. In some embodiments, hardware comprises one or more general purpose hardware processors programmed to perform embodiments of the technology based on program instructions in firmware, memory, other storage, or a combination. In some embodiments, special-purpose computing devices comprise custom hard-wired logic, ASICs, and/or FPGAs and use of custom programming to accomplish embodiments of the technology. In some embodiments, special-purpose computing devices are, e.g., desktop computer systems, portable computer systems, handheld devices, networking devices, or any other device that incorporates hard-wired and/or program logic to implement the techniques.

In some embodiments, the technology comprises use of a computer system. In some embodiments, a computer system comprises a bus or other component configured to communicate information and a hardware processor coupled with the bus for processing information. In some embodiments, the hardware processor is a general purpose microprocessor. In some embodiments, the computer system comprises a main memory, such as a random access memory (RAM) or other dynamic storage device, coupled to the bus for storing information and instructions to be executed by the processor. In some embodiments, the main memory is used for storing temporary variables or other intermediate information during execution of instructions to be executed by the processor. In some embodiments, instructions (e.g., stored in non-transitory storage media accessible to the processor) are provided to a computer system to provide a special-purpose machine that is customized to perform the operations specified in the instructions. In some embodiments, the computer system comprises a read only memory or other static storage device coupled to the bus for storing static information and instructions for the processor. In some embodiments, a storage device, such as a magnetic disk, optical disk, or solid-state drive, is provided and coupled to the bus for storing information and instructions. In some embodiments, the computer system is coupled by the bus to a display, such as a cathode ray tube (CRT), liquid crystal display (LCD), or other display technology known in the art, for displaying information to a computer user. In some embodiments, an input device (e.g., including alphanumeric and other keys) is coupled to the bus for communicating information and command selections to the processor. In some embodiments, other types of user input devices that find use for cursor control include, e.g., a mouse, a trackball, or cursor direction keys for communicating direction information and command selections to the processor and for controlling cursor movement on the display. Input devices typically have two degrees of freedom in two axes, a first axis (e.g., x) and a second axis (e.g., y), that allows the device to specify positions in a plane.

In some embodiments, the computer system implements embodiments of the technology described herein using customized hard-wired logic, one or more ASICs or FPGAs, firmware, and/or program logic that, in combination with the computer system, causes or programs the computer system to be a special-purpose machine. In some embodiments, methods described herein are performed by a computer system in response to a processor executing one or more sequences of one or more instructions contained in main memory. In some embodiments, instructions are read into main memory from another storage medium, such as a storage device. In some embodiments, execution of the sequences of instructions contained in main memory causes a processor to perform the process steps described herein. In some embodiments, hard-wired circuitry is used in place of or in combination with software instructions.

As used herein, the term "storage media" refers to any non-transitory media that store data and/or instructions that cause a machine to operate in a specific fashion. Such storage media may include non-volatile media and/or volatile media. Non-volatile media includes, for example, storage devices (e.g., optical disks, magnetic disks, or solid-state drives). Volatile media includes dynamic memory, such as main memory. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, or any other memory chip or cartridge. Storage media is distinct from but may be used in conjunction with transmission media. Transmission media participates in transferring information between storage media. For example, transmission media includes coaxial cables, copper wire and fiber optics, including the wires that include a bus. Transmission media can also take the form of acoustic or light waves, such as those generated during radio-wave (e.g., IEEE 802.11) and infra-red data communications. Transmission media also includes the Internet, WAN, and LAN.

In some embodiments, various forms of media carry one or more sequences of one or more instructions to a processor for execution. For example, the instructions may initially be carried on a magnetic disk or solid-state drive of a remote computer. The remote computer can load the instructions into its dynamic memory and send the instructions over a transmission medium. A local computer system can receive the data on the transmission medium and appropriate circuitry can place the data on a bus. The Bus carries the data to main memory, from which a processor retrieves and executes the instructions. The instructions received by main memory may optionally be stored on a storage device either before or after execution by the processor. In some embodiments, a computer system comprises a communication interface coupled to the bus. In some embodiments, a communication interface provides a two-way data communication coupling to a network link that is connected to a local network. For example, a communication interface may be an integrated services digital network (ISDN) card, cable modem, satellite modem, ethernet card, wireless radio, or a modem to provide a data communication connection to a corresponding type of telephone line. As another example, a communication interface may be a local area network (LAN) card to provide a data communication connection to a compatible LAN. Wireless links may also be implemented. In any such implementation, the communication interface sends and receives electrical, electromagnetic, or optical signals that carry digital data streams representing various types of information.

In some embodiments, a network link provides data communication through one or more networks to other data devices. For example, a network link may provide a connection through a local network to a host computer or to data equipment operated by an Internet Service Provider (ISP). An ISP in turn provides data communication services through the world wide packet data communication network now commonly referred to as the "Internet". A local network and the Internet both use electrical, electromagnetic, or optical signals that carry digital data streams. The signals through the various networks and the signals on the network link and through the communication interface, which carry the digital data to and from a computer system, are example forms of transmission media.

In some embodiments, the computer system sends messages and receives data, including program code, through the network(s), network link, and communication interfaces. For example, a server can transmit a requested code for an application program through the Internet, ISP, local network, and communication interface. In some embodiments, the received code is executed by a processor as it is received and/or stored in a storage device or other non-volatile storage for later execution.

In some embodiments, any of these hardware components are provided as a virtual component using emulation and/or cloud computing. Accordingly, as used herein, the term "hardware" and components of hardware described herein also refer to local or remote physical hardware or hardware and/or hardware components that are provide by emulation on as one or a plurality of virtual machines in a cloud environment.

Methods

Figure 3:
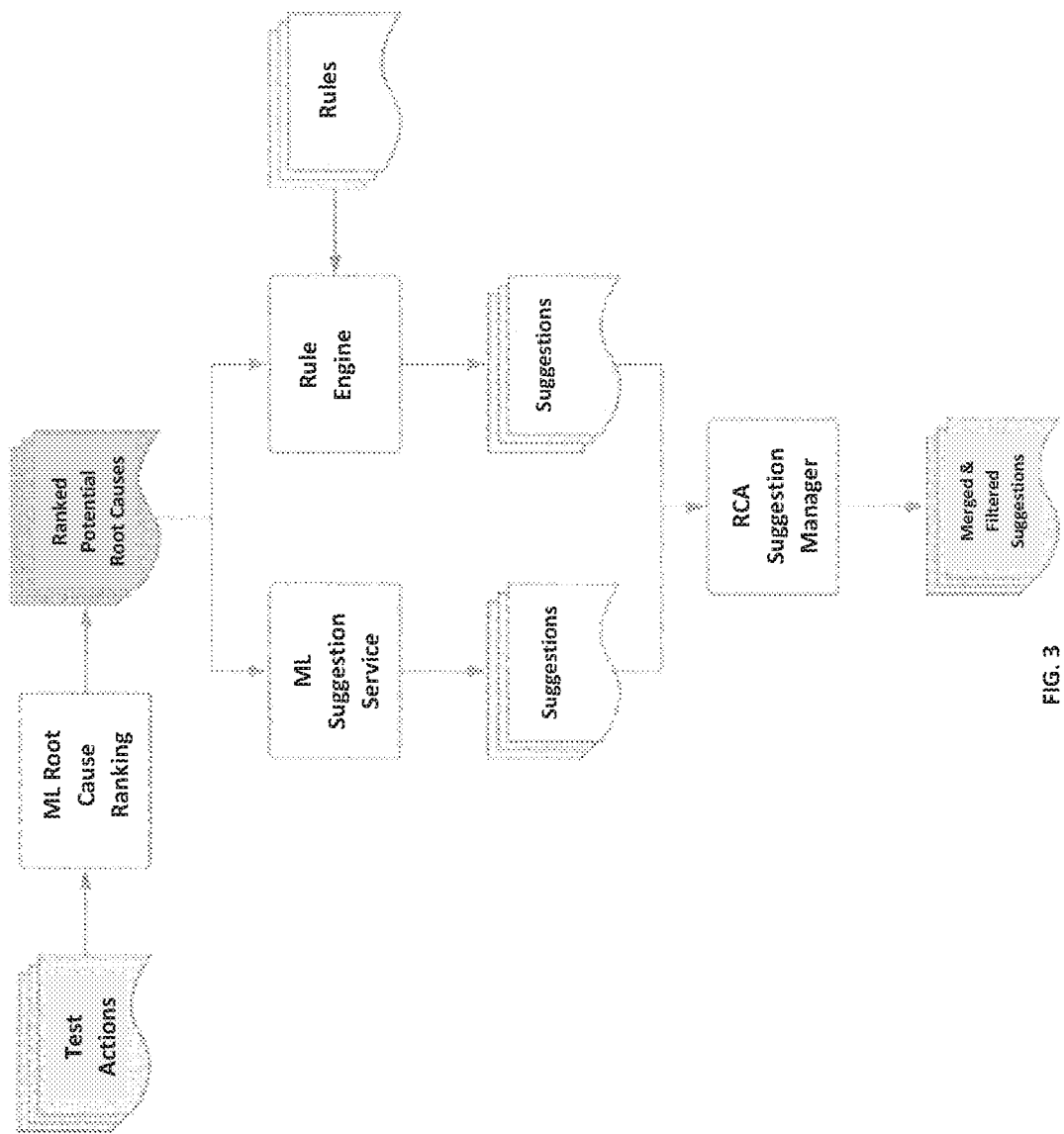
FIG. 3 is a flow diagram showing an embodiment of the technology as described herein for identifying a root cause of a software test failure and providing a suggestion.

In some embodiments, the technology relates to methods for identifying the root cause (e.g., a step, an action, an element) of a failed software test of a web application (see, e.g., FIG. 3). In some embodiments, methods comprise providing a web application (e.g., comprising one or more elements). In some embodiments, methods comprise providing a series of test actions that mimic one or more user interactions with the web application (e.g., actions of a user interacting with an element of a web application). In some embodiments, a script provides the series of test actions as a series of steps. In some embodiments, methods comprise providing a web application and a script comprising a series of steps that result in a successful test of the web application when the steps are performed on the web application (e.g., a training set). In some embodiments, methods comprise providing a plurality (e.g., 1, 2, 3, 4, 5, 6, 7, 8, 9, 10, 11, 12, 13, 14, 15, 16, 17, 18, 19, 20, 30, 40, 50, 60, 70, 80, 90, 100, or more) of scripts that result in successful tests of the web application. In some embodiments, methods comprise determining that a software test of a web application has failed. In some embodiments, methods comprise identifying the step of a software test at which the test failed. In some embodiments, methods comprise identifying an action of a step of a software test at which the test failed. In some embodiments, methods comprise identifying and/or detecting a failed software test and using machine learning to rank test actions according to the likelihood that each test action is a root cause of the failed test.

In some embodiments, methods comprise using machine learning (e.g., using data from the training set) to associate a likelihood that an action will produce an error in a test of the web application (e.g., a likelihood that an action will be a root cause of a failed test). In some embodiments, machine learning comprises use of a neural net. In some embodiments, machine learning comprises using element attributes as inputs. In some embodiments, machine learning comprises using a change in an element attribute as an input. In some embodiments, a change in an element attribute is determined using computer vision and/or analysis of software code (e.g., source code and/or object code) of the web application. In some embodiments, methods comprise ranking possible root causes of a software test according to the likelihood that the possible root causes (e.g., steps, actions, elements) will cause a software test to fail. In some embodiments, machine learning is used to rank possible root causes of a software test according to the likelihood that the possible root causes (e.g., steps, actions, elements) will cause a software test to fail. In some embodiments, methods comprise producing a ranked list of possible root causes (e.g., steps, actions, elements) ranked by the likelihood of producing a failed test of a web application.

In some embodiments, methods comprise providing a rule engine comprising rules (e.g., rules comprising criteria (e.g., a "when" portion of the rule) that when satisfied by a condition (e.g., data, step, action) trigger a suggestion). In some embodiments, the ranked list of possible root causes is provided to the rule engine. In some embodiments, a rule of the rule engine is triggered by a possible root cause and the rule engine produces a suggestion for correcting the root cause of the failed software test.

In some embodiments, methods comprise providing a machine learning suggestion service. In some embodiments, the machine learning suggestion service comprises suggestions for correcting the root cause of a failed software test based on using machine learning and one or more training sets to identify likely root causes of a failed software test and to suggest corrections of the identified root causes.

In some embodiments, suggestions produced by the rules engine and suggestions produced by the machine learning suggestion service are combined into a suggestion pool. In some embodiments, the suggestion pool is sorted and/or deduplicated. In some embodiments, methods output the sorted and/or deduplicated suggestion pool, e.g., to a user, to a component configured to provide automated repair of software failures, etc.

In some embodiments, methods comprise producing a graphical model of elements of a web application. In some embodiments, methods comprise producing a plurality of graphical models for a plurality of versions of a web application. In some embodiments, methods comprise identifying differences of one or more graphical elements between two versions of a web application (e.g., a web application UI) and/or of one or more graphical models corresponding to one or more versions of a web application (e.g., a web application UI).

In some embodiments, methods comprise providing a web application and a script to test the web application (e.g., a test case). In some embodiments, the script is run to test the web application. In some embodiments, changes to the web application are made (e.g., changing the value of one or more attributes of one or more elements of the web application) and the script is run to test the web application. In some embodiments, scripts comprising different steps (e.g., comprising different actions) are provided to test a plurality of versions on a web application. In some embodiments, methods comprise producing a probabilistic graphical model (PGM) (e.g., from a plurality of graphical models describing a plurality of versions of a web application and, optionally, describing changes of a first graphical model relative to a second graphical model). In some embodiments, the PGM is produced using computer vision, machine learning, a neural net, and/or analysis of web application source code and/or object code. In some embodiments, methods comprise evaluating a PGM to identify actions likely to be a root cause of the software test failure. In some embodiments, methods comprise evaluating a PGM to rank actions of a script according to the likelihood that each action is a root cause of the software test failure. In some embodiments, methods comprise producing a list of actions of a script sorted by likelihood of each action to be a root cause of software test failure. In some embodiments, the list of actions of a script sorted by likelihood of each action to be a root cause of software test failure is provided to a rules engine to be tested by one or more rules. In some embodiments, the rules engine provides a suggestion for correcting the root cause of the failed test. See, e.g., FIG. 1.

Systems

Some embodiments relate to systems for identifying the root cause (e.g., a step, an action, an element) of a failed software test of a web application (see, e.g., FIG. 3). In some embodiments, systems comprise a script (e.g., comprising test actions). In some embodiments, systems comprise a component to execute the script and perform the test actions on a web application (e.g., the UI of a web application). In some embodiments, systems comprise a training set. In some embodiments, systems comprise a plurality of scripts, a plurality of versions of a web application, and/or a plurality of training sets. In some embodiments, a training set comprises a web application, a test script, and a test result of the test script run on the web application. In some embodiments, systems comprise a component for ranking test actions according to the likelihood of each test action being a root cause of test failure. In some embodiments, the component for ranking test actions according to the likelihood of each test action being a root cause of test failure is a machine learning component. In some embodiments, the machine learning component comprises a neural net. In some embodiments, systems comprise a graphical model of a web application UI. In some embodiments, systems comprise a plurality of graphical models of different versions of a web application UI. In some embodiments, one or more graphical models is/are evaluated using machine learning to provide a likelihood that each test action is a root cause of a test failure. In some embodiments, the machine learning component for ranking test actions according to the likelihood of each test action being a root cause of test failure produces a list of test actions that are ranked according to the likelihood of each test action being a root cause of test failure. In some embodiments, systems comprise a component configured to provide a machine learning suggestion service. In some embodiments, systems comprise a rule engine. In some embodiments, systems comprise a suggestion manager. In some embodiments, systems comprise merged and filtered suggestions produced by the suggestion manager.

Although the disclosure herein refers to certain illustrated embodiments, it is to be understood that these embodiments are presented by way of example and not by way of limitation.

EXAMPLES

Example 1

Text Box Detection

Figure 5:
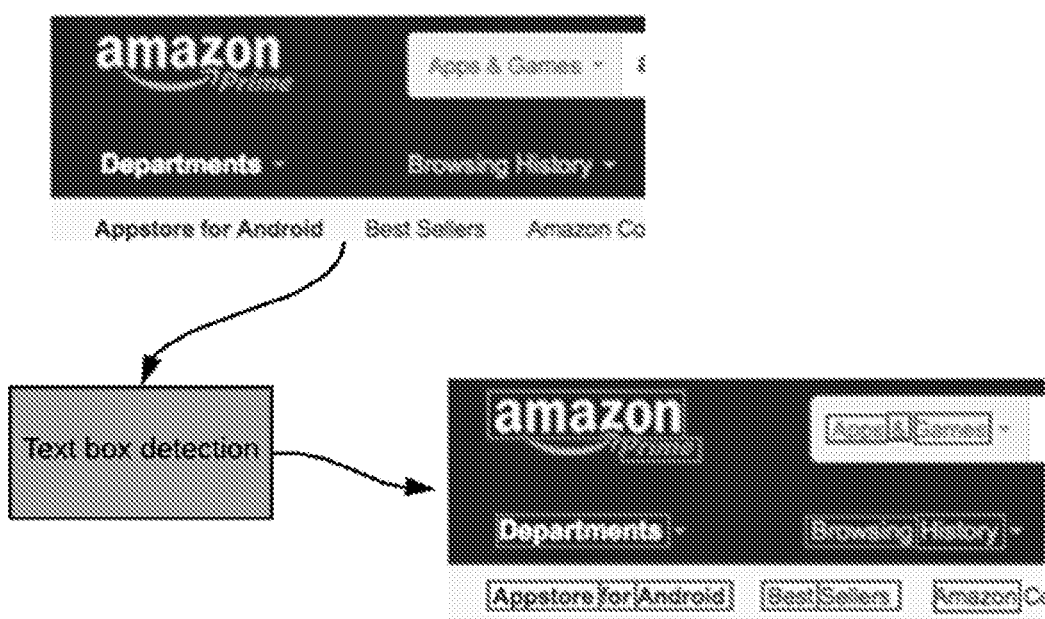
FIG. 5 shows a schematic of exemplary input web application processed by a text box detection technology and exemplary output produced by the text box detection technology.

During the development of embodiments of the technology provided herein, experiments were conducted to test methods and systems for text box detection (e.g., to detect text boxes on a web application UI). As shown in FIG. 5, a web application was provided to the text box detection component of a template validation system. The text box detection component machine learning and/or deep learning (e.g., neural network) analyzes the input web application (e.g., the UI of the web application). The text box detection component produces an output comprising the locations and dimensions of text boxes on the UI.

Example 2

Element Detection

Figure 7:
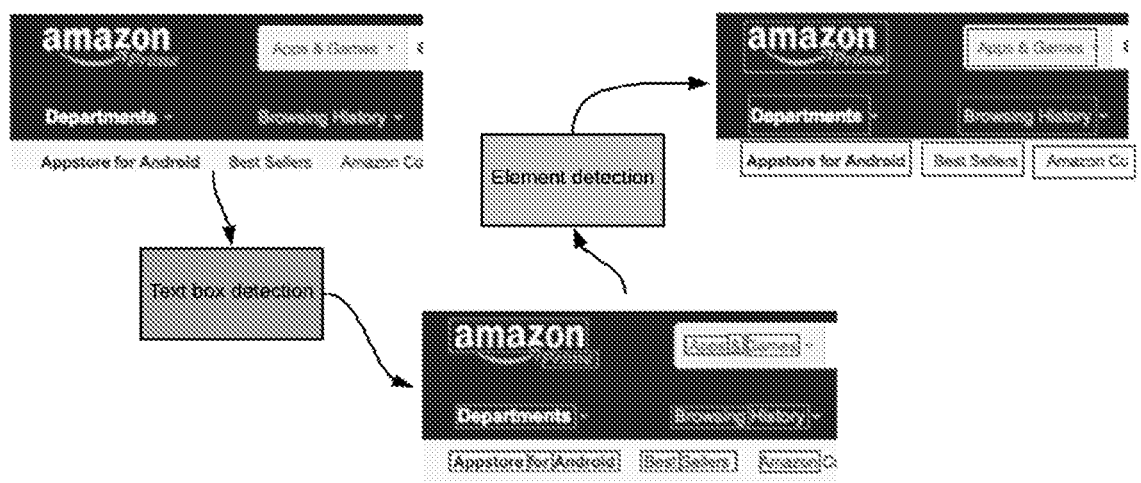
FIG. 7 shows a schematic of exemplary input web application processed by a text box detection technology and exemplary output produced by the text box detection technology. The output of the text box detection technology is passed to an element detection technology. An exemplary output of the element detection technology is shown.

During the development of embodiments of the technology provided herein, experiments were conducted to test methods and systems for element detection (e.g., to detect elements on a web application UI). As shown in FIG. 7, a web application was provided to the text box detection component of a template validation system. The text box detection component machine learning and/or deep learning (e.g., neural network) analyzes the input web application (e.g., the UI of the web application). The text box detection component produces an output comprising the locations and dimensions of text boxes on the UI and provides the output to the element detection component. The element detection component groups detects non-text box objects and groups text boxes by defining each text box as a vector $u=(x, y, w, h)$, where x and y represent the pixel position in the document screenshot or viewport and w and h represent the width and height of the box, determining a distance between text boxes, and performing density-based clustering to group text boxes into clusters of text boxes. For example, the text box detection component identified a first text box comprising the text "amazon" and identified a second text box comprising the text "prime". The element detection component performed distance calculations and clustering to produce a text box cluster comprising both the "amazon" text box and the "prime" text box. See, e.g., FIG. 7. In the same manner, other text boxes were grouped and output by the element detection component.

Example 3

Object Detection

Figure 8:
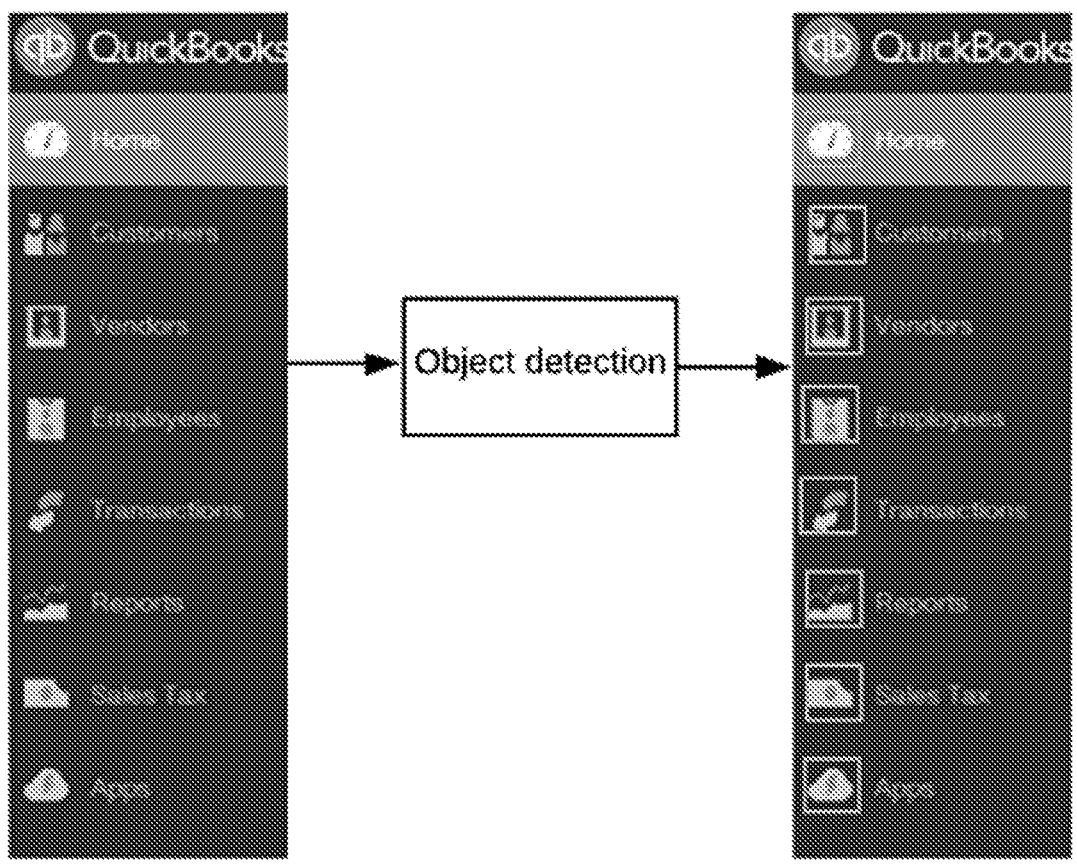
FIG. 8 shows a schematic of exemplary input web application processed by an object detection technology and exemplary output produced by the object detection technology.

During the development of embodiments of the technology provided herein, experiments were conducted to test methods and systems for object detection (e.g., to detect non-text objects on a web application UI). As shown in FIG. 8, a web application UI was provided to an object detection component of a template validation system. The object detection component machine learning and/or deep learning (e.g., neural net) has been trained using a training set of icons (e.g., a cart icon, arrow icon, open file icon, save file icon, login icon, checked icon, bullet icon, and a close icon). The object detection component produces an output comprising the locations and dimensions of objects on the UI. See FIG. 8. The object detection component identifies the location and/or dimensions of objects on the UI.

Example 4

Selection Logic

Figures 9A, 9B, 9C:
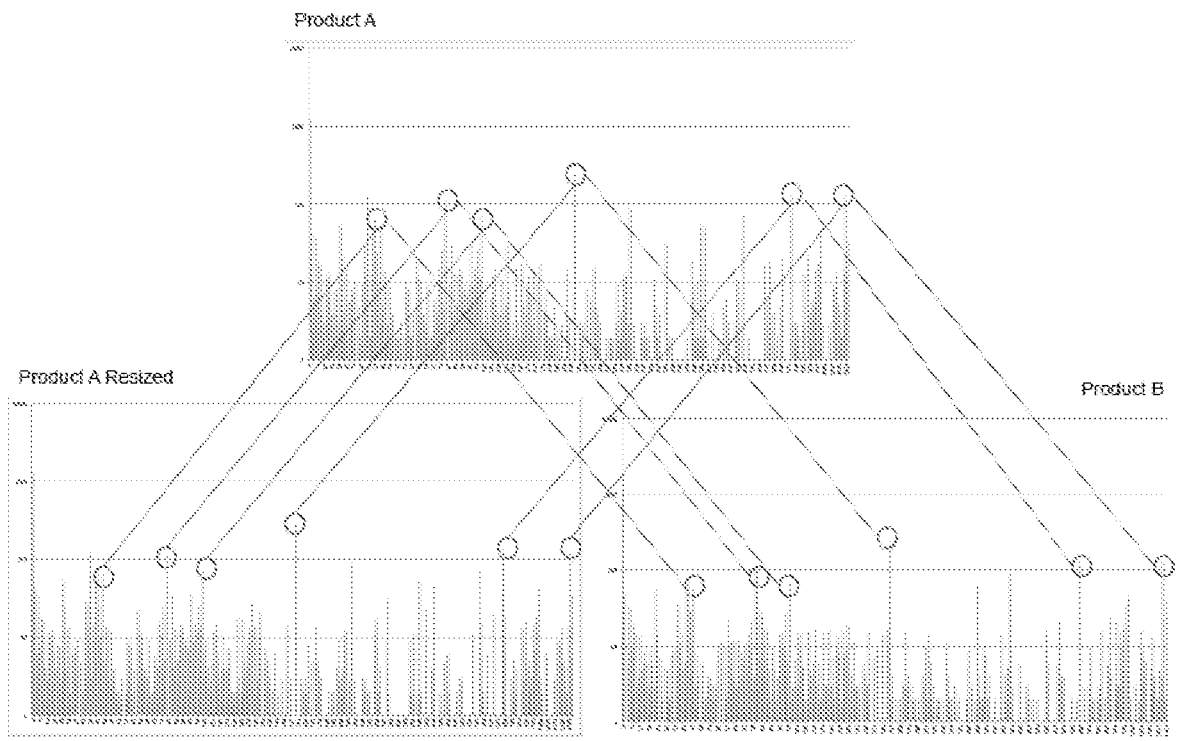
FIG. 9A shows a frequency distribution of element color attributes for a web page on two different days and assigning a probabilistic association between elements.
FIG. 9B shows a frequency distribution of element height attributes for a web page on two different days and assigning a probabilistic association between elements.
FIG. 9C shows histograms of element widths for two different pages and associates elements on the two pages according to distributions determined by the technology provided herein.

During the development of embodiments of the technology described herein, experiments were conducted to test systems and methods of evaluating a distribution of elements and/or element attributes and determining a probability of distributions of elements and/or element attributes across a page and/or through time. The background color frequency used in elements was recorded for a page on Jun. 25, 2019 (version 1) and on Jul. 20, 2019 (version 2). See FIG. 9A. In FIG. 9A, the frequency of colors (left columns) is provided in the right column. The attribute distribution (e.g., frequency of colors) was used to produce probabilistic associations between elements between versions (e.g., see arrows associating elements with % on FIG. 9A). The technology described herein identified an element having color 219, 219, 219 on version 1 that did not exist on version 2. The technology identified an associated element on version two with color 254, 249, 219. As shown on FIG. 9A, the probabilistic association was 90%. Accordingly, the technology calculated a probability (e.g., a high probability) that the element of version 1 having color 219, 219, 219 was changed to the element having color 254, 249, 219 (e.g., a color attribute of the element was changed from version 1 to version 2). In subsequent analyses of the page versions, the software identified the element in part by using its new color of 254, 249, 219. The technology warned the user of the change. The analysis was repeated for all elements and all attributes of all elements. In some embodiments, the technology comprises performing the identification and evaluation of elements and/or element attributes in higher dimensions, e.g., using a tensor. In similar experiments, an element was identified that had a height attribute that changed from 15 pixels to 5 pixels. See FIG. 9B. FIG. 9B shows elements having certain colors in column one and the distribution of heights of 0, 1, 5, 10, 13, and 15 pixels for the elements in columns 2-7. The attribute distribution (e.g., frequency of heights) was used to produce probabilistic associations between elements between versions. The probabilistic association was used to identify an element having a changed height.

Further, in additional experiments, the technology determined distributions of widths for elements on two different pages. See FIG. 9C. In some embodiments, a first distribution of widths for a first page or a first version of a UI is determined and a second distribution of widths for a second page or a second version of said UI is determined. The attribute distribution (e.g., frequency of widths) was used to produce probabilistic associations between elements between the two pages. The technology is not limited to determining a distribution of widths or any particular element attribute. Accordingly, the technology comprises determining a distribution of an element attribute for a page or a version of a UI. In some embodiments, the technology comprises determining a first distribution of an element attribute for a first page or a first version of a UI, determining a second distribution of said element attribute for a second page or a second version of said UI, and assigning probabilistic associations between elements on the first page or version of a UI and elements on a second page or version of the UI. Experiments above describe use of distributions of color, width, and height; however, the technology includes producing and evaluation distributions of any element attribute to associate an element on one page or UI version with a second page or UI version.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A method for identifying a root cause of a failed software test of a web application comprising a user interface, said method comprising:

providing a web application comprising a user interface;
providing a script comprising a series of test steps, wherein each test step comprises an action performed on an element of said user interface;
running said script on said web application;
identifying an error step of said script at which a failed software test reports a failure;
identifying first elements of a first version of said user interface using computer vision and determining element attributes for each element of said first elements;
identifying second elements of a second version of said user interface using computer vision and determining element attributes for each element of said second elements;
identifying differences between said first version of said user interface and said second version of said user interface by comparing said element attributes for each element of said first elements with said element attributes for each element of said second elements;
training a probabilistic model using a plurality of test steps and said differences to produce a trained probabilistic model; and
assigning to each test step and/or to each element of said user interface a likelihood that each test step and/or each element is a root cause of said error step of said failed software test; and
producing a list of suggested test steps and/or elements ranked by said likelihood that each suggested test step and/or element is the root cause of said error step of said failed software test.

2. The method of claim 1 wherein using computer vision comprises detecting a text box, recognizing characters, detecting an element, detecting an object, and/or detecting a layout.

3. The method of claim 1 wherein identifying differences between said first version of said user interface and said second version of said user interface comprises comparing a first graphical and/or attribute model of said first version of said user interface with a second graphical and/or attribute model of said second version of said user interface to produce a probabilistic graphical and/or attribute model.

4. The method of claim 1 wherein said training comprises assigning weighted scores to attribute categories, elements, and/or test steps.

5. The method of claim 1 wherein said assigning step comprises evaluating said probabilistic model to determine said likelihood that each test step and/or each element is a root cause of said failed software test.

6. The method of claim 1 wherein said training comprises using a machine learning model.

7. The method of claim 1 wherein determining element attributes for each element of said first elements and/or determining element attributes for each element of said second elements comprises analyzing source code associated with each element of said first elements and/or analyzing source code associated with each element of said second elements.

8. The method of claim 1 wherein each suggested test step and/or element is evaluated by a rules engine to provide suggested corrections to correct said root cause.

9. A method for correcting a failed software test case configuration comprising a failed test step, the method comprising:

receiving a list of candidate failed test steps and/or candidate elements of said failed test steps ranked by a likelihood that each candidate failed test step is the root cause of a failed software test;
providing each candidate failed test step of said list of candidate failed test steps to a Markov decision process to produce a plurality of trial test case configurations for each candidate failed test step;

executing each trial test case configuration for each candidate failed test step;

identifying a successful software test;

identifying a trial test case configuration that produced the successful software test;

comparing said failed software test case configuration and said trial test case configuration that produced the successful software test to identify differences in the trial test case relative to the failed software test case; and correcting said failed software test case configuration by replacing a failed step with a corrected step, wherein said corrected step implements said differences in the trial test case relative to the failed software test case.

10. The method of claim 9 wherein said executing step comprises executing in parallel each trial test case configuration for each candidate failed test step.

11. The method of claim 9 wherein said list of candidate failed test steps is produced by a method comprising:

providing a web application comprising a user interface;

providing a software test case configuration comprising a script comprising a series of test steps, wherein each test step comprises an action performed on an element of said user interface;

running said script on said web application; and producing said list of candidate failed test steps ranked by a likelihood that each candidate failed test step is the root cause of said failed software test.

12. The method of claim 11 wherein producing said list of candidate failed test steps comprises:

identifying first elements of a first version of said user interface using computer vision and determining element attributes for each element of said first elements;

identifying second elements of a second version of said user interface using computer vision and determining element attributes for each element of said second elements;

identifying differences between said first version of said user interface and said second version of said user interface by comparing said element attributes for each element of said first elements with said element attributes for each element of said second elements;

training a probabilistic model using said differences to produce a trained probabilistic model; and assigning to each test step and/or to each element of said user interface said likelihood that each test step and/or each element is a root cause of said failed software test.

13. A method for autonomously identifying failures in a web application comprising a user interface, said method comprising:

analyzing a web application user interface to identify elements of the user interface;

analyzing source code of a web application to identify element functions associating element functions with elements of the user interface to produce element-function associations;

inputting web application user interface geometry, text, and images to train a machine learning model; and inputting said elements, element functions, and element-function associations into said trained machine learning model to identify anomalies in the web application user interface that produce failures in said web application.

14. The method of claim 13 wherein analyzing a web application user interface to identify elements of the user interface comprises use of a machine learning model.

15. The method of claim 13 wherein analyzing source code of a web application to identify element functions comprises use of natural language processing.

16. The method of claim 13 further comprising providing a parallel web crawler to provide one or more web application user interface.

17. The method of claim 13 wherein the method is performed for each step of a test script to validate a web application user interface.

* * * * *